(12) United States Patent
Karpukhin

(10) Patent No.: US 10,818,284 B2
(45) Date of Patent: Oct. 27, 2020

(54) METHODS OF AND ELECTRONIC DEVICES FOR DETERMINING AN INTENT ASSOCIATED WITH A SPOKEN USER UTTERANCE

(71) Applicant: YANDEX EUROPE AG, Lucerne (CH)

(72) Inventor: Ivan Aleksandrovich Karpukhin, Elektrostal (RU)

(73) Assignee: YANDEX EUROPE AG, Lucerne (CH)

( * ) Notice: Subject to any disclaimer, the term of this patent is extended or adjusted under 35 U.S.C. 154(b) by 220 days.

(21) Appl. No.: 16/202,257

(22) Filed: Nov. 28, 2018

(65) Prior Publication Data

US 2019/0362712 A1    Nov. 28, 2019

(30) Foreign Application Priority Data

May 23, 2018   (RU) ................................ 2018118997

(51) Int. Cl.
*G10L 15/00* (2013.01)
*G10L 15/18* (2013.01)
(Continued)

(52) U.S. Cl.
CPC .......... *G10L 15/1815* (2013.01); *G10L 15/16* (2013.01); *G10L 15/22* (2013.01);
(Continued)

(58) Field of Classification Search
CPC combination set(s) only.
See application file for complete search history.

(56) References Cited

U.S. PATENT DOCUMENTS 7,392,187 B2    6/2008  Bejar et al.
7,840,404 B2    11/2010 Xi et al.
(Continued)

FOREIGN PATENT DOCUMENTS

RU    2466468 C1    11/2012
RU    2583150 C1    5/2016
(Continued)

OTHER PUBLICATIONS

Ze-Jing Chuang and Chung-Hsien Wu, "Multi-Modal Emotion Recognition from Speech and Text", Computational Linguistics and Chinese Language Processing, vol. 9, No. 2, Aug. 2004, pp. 45-62, http://www.aclweb.org/anthology/O04-3004.
(Continued)

*Primary Examiner* — Vu B Hang
(74) *Attorney, Agent, or Firm* — BCF LLP

(57) ABSTRACT

A method and server for determining an intent associated with a spoken user utterance are disclosed. The method includes determining at least one speech unit where each speech unit has textual data representative of a word or pause and has a corresponding segment of the digital audio signal. For each speech unit, the method includes generating a respective textual feature, generating a respective acoustic feature vector and generating a respective enhanced feature vector. The method also includes employing a neural network (NN) configured to determine the intent of the spoken user utterance by inputting into the NN the enhanced feature vectors. The NN has been trained to estimate a probability of the intent being of a given type.

20 Claims, 9 Drawing Sheets

(51) Int. Cl.
  *G10L 15/22*  (2006.01)
  *G10L 25/90*  (2013.01)
  *G10L 15/30*  (2013.01)
  *G10L 25/21*  (2013.01)
  *G10L 15/16*  (2006.01)
  *G10L 25/30*  (2013.01)

(52) U.S. Cl.
  CPC .............. *G10L 15/30* (2013.01); *G10L 25/21* (2013.01); *G10L 25/30* (2013.01); *G10L 25/90* (2013.01)

(56) References Cited

U.S. PATENT DOCUMENTS

| | | | |
|---|---|---|---|
| 8,165,873 | B2 | 4/2012 | Yamada |
| 8,566,088 | B2 | 10/2013 | Pinson et al. |
| 9,031,293 | B2 | 5/2015 | Ozlem |
| 2013/0262096 | A1 | 10/2013 | Wilhelms-Tricarico et al. |
| 2016/0163312 | A1 | 6/2016 | Henton et al. |
| 2017/0263248 | A1 | 9/2017 | Gruber et al. |
| 2017/0263249 | A1 | 9/2017 | Akbacak et al. |

FOREIGN PATENT DOCUMENTS

| | | |
|---|---|---|
| RU | 2597498 C1 | 9/2016 |
| RU | 2692051 C1 | 6/2019 |

OTHER PUBLICATIONS

Wu, S., Falk, T., Chan, W.-Y., "Automatic speech emotion recognition using modulation spectral features", ScienceDirect, Speech Communication, vol. 53, Issue 5, May-Jun. 2011, pp. 768-785; http://citeseerx.ist.psu.edu/viewdoc/download?doi=10.1.1.420.6766&rep=rep1&type=pdf.

Polynomial regression, Wikipedia, https://en.wikipedia.org/wiki/Polynomial_regression.

Dzmitry Bahdanau and Kyunghyun Cho Yoshua Bengio, "Neural machine translation by jointly learning to align and translate", Published as Conference Paper at ICLR 2015, May 19, 2016, pp. 1-15.

Russian Search Report dated Aug. 8, 2019 in connection with the priority application RU2018118997.

METHODS OF AND ELECTRONIC DEVICES FOR DETERMINING AN INTENT ASSOCIATED WITH A SPOKEN USER UTTERANCE

CROSS-REFERENCE

The present application claims priority to Russian Patent Application No. 2018118997, entitled "Methods of and Electronic Devices for Determining an Intent Associated with a Spoken Utterance," filed May 23, 2018, the entirety of which is incorporated herein by reference.

FIELD

The present technology relates to intelligent personal assistant systems and, more particularly, to methods and electronic devices for determining an intent associated with a spoken user utterance.

BACKGROUND

Electronic devices, such as smartphones and tablets, are able to access an increasing and diverse number of applications and services for processing and/or accessing different types of information. However, novice users and/or impaired users and/or users operating a vehicle may not be able to effectively interface with such devices mainly due to the variety of functions provided by these devices or the inability to use the machine-user interfaces provided by such devices (such as a key board). For example, a user who is driving or a user who is visually-impaired may not be able to use the touch screen key board associated with some of these devices.

Intelligent Personal Assistant (IPA) systems have been developed to perform functions in response to user requests. Such IPA systems may be used, for example, for information retrieval and navigation but are also used for simply "chatting". A conventional IPA system, such as Siri® IPA system for example, can receive a spoken user utterance in a form of digital audio signal from a device and perform a large variety of tasks for the user. For example, a user can communicate with Siri® IPA system by providing spoken utterances (through Siri®'s voice interface) for asking, for example, what the current weather is, where the nearest shopping mall is, and the like. The user can also ask for execution of various applications installed on the electronic device. As mentioned above, the user may also desire to simply and naturally "chat" with the IPA system without providing any specific requests to the system.

Conventional IPA systems are mainly focused on extracting textual data from the digital audio signal and on analyzing this textual data for providing logical information in response. However, in some cases, two spoken user utterances may have a textually-identical representation while being associated with different intents. For example, two spoken user utterances may have a textually-identical representation being "Today is beautiful", although a first spoken user utterance may be a statement while the second spoken user utterance may be a question. As a result, different information ought to be provided to users having submitted their respective spoken user utterances. For example, the user of the first spoken utterance may be provided with "Indeed" while the second user of the second spoken utterance may be provided with information regarding the current weather. For that reason, providing intent-specific information may be a challenging task.

SUMMARY

Developers of the present technology have appreciated certain technical drawbacks associated with the existing IPA systems. Conventional IPA systems are focused on providing logical responses to spoken user utterances. However, it should be noted that utterances may be associated with "intents", i.e. are submitted in view of an "intent" of the user, and depending on the intent of a given utterance, the logical response thereto may be different. For example, two user utterances may be textually-identical but may be associated with different intents of the user and, therefore, it may be appropriate to provide two different intent-specific responses to the two user utterances.

It is an object of the present technology to ameliorate at least some of the inconveniences present in the prior art. Developers of the present technology envisaged a system that takes into account acoustic properties of the spoken user utterance in order to determine intent-specific responses to be provided to users. Developers realize that the intents are, in a sense, "hidden" within the acoustic properties of spoken user utterances and, therefore, an analysis and treatment thereof may provide information indicative of the specific intent of a given spoken user utterance.

It is contemplated that the system as envisaged by the developers of the present technology allows analyzing spoken user utterances in order to determine intents associated therewith. The envisaged system is, configured to take into account not only the acoustic properties of the spoken user utterance but, also the textual representation of the spoken user utterance, in order to determine the intent of the spoken user utterance.

In some embodiments of the present technology, once the spoken user utterance is acquired by the system in a form of a digital audio signal, the system is configured to determine acoustic features and textual features associated with each word having been "uttered" by the user. Also, the system is configured to determine the acoustic features associated with pauses between the "uttered" words and use them in combination with the acoustic features and the textual features of each word in order to determine the intent of the spoken user utterance.

In a first broad aspect of the present technology, there is provided a method of determining an intent associated with a spoken user utterance, where the spoken user utterance has been captured in a form of a digital audio signal, and where the method is executable by a server. The method comprises executing, by the server, a speech-to-text analysis of the digital audio signal to determine at least one speech unit of the spoken user utterance, where each speech unit has textual data representative of one of a word and a pause, and where each speech unit has a corresponding segment of the digital audio signal. The method comprises, for each speech unit, generating a respective textual feature vector by (i) determining, by the server based on the respective textual data, textual features of the respective speech unit and (ii) generating, by the server based on the respective textual features, the respective textual feature vector. The method comprises for each speech unit generating a respective acoustic feature vector by (i) determining, by the server based on the corresponding segment of the digital audio signal, respective acoustic features of the corresponding segment of the digital audio signal and (ii) generating, by the server based on the respective acoustic features, the respective acoustic feature vector. The method comprises for each speech unit generating, by the server, a respective enhanced feature vector by combining the respective acoustic feature vector and the respective textual feature vector. The method comprises employing, by the server, a neural network (NN) configured to determine the intent of the spoken user utterance by inputting into the NN the enhanced feature vectors, where the NN has been trained to estimate a probability of the intent being of a given type.

In some embodiments of the method, the NN is a recurrent neural network (RNN).

In some embodiments of the method, the executing the speech-to-text analysis comprises determining (i) the textual data of each speech unit and (ii) a time interval of the corresponding segment of the digital audio signal of each speech unit.

In some embodiments of the method, the generating the respective textual feature vector is executed by a word embedding process implemented by the server.

In some embodiments of the method, the textual feature vector of a given speech unit that is a pause is a vector with null values.

In some embodiments of the method, the acoustic features are at least some of: volume level, energy level, pitch level, harmonicity and tempo.

In some embodiments of the method, the determining the respective acoustic features of the corresponding segment of the digital audio signal comprises determining, by the server, respective acoustic features of each sub-segment of the corresponding segment of the digital audio signal by applying a sliding window. Also, the generating the respective acoustic feature vector comprises (i) generating, by the server, respective intermediary acoustic feature vectors for each sub-segment based on the respective acoustic features and (ii) generating, by the server based on the respective intermediary acoustic feature vectors, where the respective acoustic feature vector is for the corresponding segment of the digital audio signal.

In some embodiments of the method, each sub-segment is of a pre-determined time length.

In some embodiments of the method, at least two sub-segments partially overlap.

In some embodiments of the method, the sliding window slides with a time step of another pre-determine time length.

In some embodiments of the method, the generating the respective acoustic feature vector for the corresponding segment of the digital audio signal based on the respective intermediary acoustic feature vectors comprises executing, by the server, a statistically-driven combination of the respective intermediary acoustic feature vectors.

In some embodiments of the method, the combining the respective acoustic feature vector and the respective textual feature vector comprises concatenating, by the server, the respective acoustic feature vector and the respective textual feature vector.

In some embodiments of the method, the given type is one of: open-ended question type, closed-ended question type, statement type, and exclamation type.

In some embodiments of the method, the method further comprises acquiring, by the server, auxiliary data generated by the NN for each inputted enhanced feature vector associated with a given word. Responsive to determining that the intent is of the given type, the method comprises executing, by the server, an auxiliary MLA for determining a target word amongst the at least one word by inputting into the auxiliary MLA the auxiliary data. The target word is indicative of a context of the spoken user utterance.

In a second broad aspect of the present technology, there is provided a server for determining an intent associated with a spoken user utterance, where the spoken user utterance has been captured in a form of a digital audio signal. The server is configured to execute a speech-to-text analysis of the digital audio signal to determine at least one speech unit of the spoken user utterance, where each speech unit has textual data representative of one of a word and a pause, and where each speech unit has a corresponding segment of the digital audio signal. The server is configured to, for each speech unit generate a respective textual feature vector by (i) determining, by the server based on the respective textual data, textual features of the respective speech unit and (ii) generating, by the server based on the respective textual features, the respective textual feature vector. The server is configured to, for each speech unit, generate a respective acoustic feature vector by (i) determining, by the server based on the corresponding segment of the digital audio signal, respective acoustic features of the corresponding segment of the digital audio signal and (ii) generating, by the server based on the respective acoustic features, the respective acoustic feature vector. The server is configured to, for each speech unit, generate a respective enhanced feature vector by combining the respective acoustic feature vector and the respective textual feature vector. The server is configured to employ a neural network (NN) configured to determine the intent of the spoken user utterance by inputting into the NN the enhanced feature vectors, where the NN has been trained to estimate a probability of the intent being of a given type.

In some embodiments of the server, the NN is a recurrent neural network (RNN).

In some embodiments of the server, the server configured to execute the speech-to-text analysis comprises the server configured to determine the textual data of each speech unit and a time interval of the corresponding segment of the digital audio signal of each speech unit.

In some embodiments of the server, the server configured to determine the respective acoustic features of the corresponding segment of the digital audio signal comprises the server configured to determine respective acoustic features of each sub-segment of the corresponding segment of the digital audio signal by applying a sliding window. The server configured to generate the respective acoustic feature vector comprises the server configured to (i) generate respective intermediary acoustic feature vectors for each sub-segment based on the respective acoustic features and (ii) generate, based on the respective intermediary acoustic feature vectors, the respective acoustic feature vector for the corresponding segment of the digital audio signal.

In some embodiments of the server, the given type is one of: open-ended question type, closed-ended question type, statement type and exclamation type.

In some embodiments of the server, the server is further configure to acquire auxiliary data generated by the NN for each inputted enhanced feature vector associated with a given word. Responsive to determining that the intent is of the given type, the server is configured to execute an auxiliary MLA for determining a target word amongst the at least one word by inputting into the auxiliary MLA the auxiliary data. The target word is indicative of a context of the spoken user utterance.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
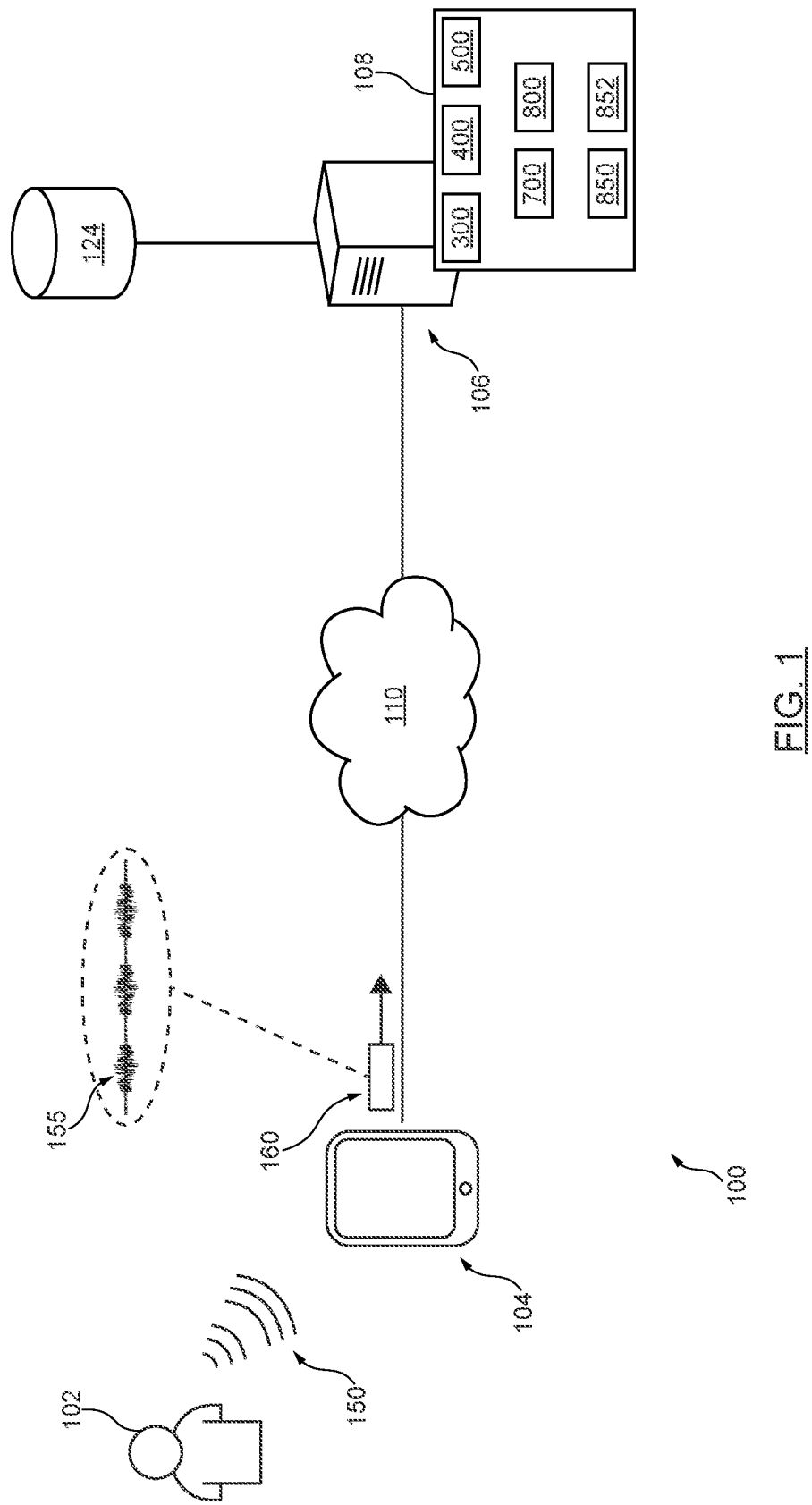
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to determine intents associated with spoken user utterances. For example, a spoken user utterance 150 of a user 102 may be detected by an electronic device 104 (or simply a "device 104"), which, in response, is configured to provide intent-specific information to the user 102 based on the associated intent, in some cases, in a form of a "machine-generated utterance". Thus, it can be said that this results in some type of "intent-specific information exchange" between the user 102 and the device 104, such as a intent-specific human-machine conversation, where the intent-specific human-machine conversation is composed of (i) the spoken user utterance 150 associated with an intent determined by the system 100 and (ii) the machine-generated utterance indicative of the intent-specific information that is specific to the intent associated with the spoken user utterance 150.

Generally speaking, a given spoken user utterance may be associated with a given type of intent that is instrumental in determining the intent-specific information to be provided. For example, different types of intent may be associated with a given spoken user utterance, such as: an open-ended question type, a closed-ended question type, a statement type, an exclamation type, and the like. As it will be understood, the type of intent may vary depending on inter alia the information that a given user desires to be provided with.

Without being bound to any specific theory, information indicative of the intent can be said to be at least partially "hidden" in acoustic properties of spoken user utterances.

For example, let it be assumed that the spoken user utterance 150 of the user 102 is "Sounds good". In this case, when heard by a human (such as the user 102), the human may determine that the associated intent is more likely to be a statement since the user 102 seems to be stating that something is to his/her liking. In other words, a human may determine based on the acoustic properties of the spoken user utterance 150 that the user 102 is confirming his/her approval and is simply "chatting", instead of asking a question and expecting to receive information responsive to that question.

As previously mentioned, it is to be understood that different intent-specific information may be provided for a given spoken user utterance and will depend on inter alia the type of intent associated with the given spoken user utterance.

For example, let it be assumed that the spoken user utterance 150 of the user 102 is "Is today a beautiful day". In this case, when heard by a human, the human may first determine that the associated intent is more likely to be some type of question instead of a statement. In other words, a human may determine, based on the acoustic properties of the spoken user utterance 150, that the user 102 is asking some type of question and wants to be provided with information responsive to that question.

However, in addition, the spoken user utterance 150 "Is today a beautiful day" may be associated with different types of questions (e.g., open-ended and closed-ended) and, therefore, different intent-specific information may be provided in response.

On the one hand, when heard by a human, the human may further determine that, based on the acoustic properties of the spoken user utterance 150, the spoken user utterance 150 is of a closed-ended question type, such as whether or not today is a beautiful day. As a result, the human may further determine, based on the closed-ended question type of intent associated with the spoken user utterance 150, that the intent-specific information to be provided is a yes/no or any other binary type of response.

On the other hand, when heard by a human, the human may alternatively determine, based on the acoustic properties of the spoken user utterance 150, that the spoken user utterance 150 is of an open-ended question type, such as what is today's weather in general. As a result, the human may alternatively determine that, based on the open-ended question type of intent associated with the spoken user utterance 150, the intent-specific information to be provided is the current weather.

Indeed, when a given spoken user utterance is heard by a human, the determination of the type of intent associated with a given spoken user utterance is easily performed and, therefore, information that is specific to that type of intent may be provided with more ease. Generally speaking, a human's brain capabilities are remarkably well-suited for this type of task where the given spoken user utterance is detected by the neural receptors of the ear and converted into acoustic information that is then analyzed, by the neurons and synapses forming computational units of the brain, for determining the type of intent of the given spoken user utterance. Put another way, it is second nature for a human to determine the type of intent associated with the given spoken user utterance and, therefore, humans are well adapted for providing intent-specific information in response thereto.

Conversely, when a given spoken user utterance is detected by a computer system, it is a different story. Conventional computer systems are not as effective and efficient as humans for determining the type of intent associated with a given spoken user utterance and, therefore, provision of intent-specific information by computer systems in response to the given spoken user utterance is a difficult task.

In some embodiments of the present technology, as previously mentioned, it is contemplated that the system 100 may be configured to determine the intent associated with a given spoken user utterance and provide, in response, intent-specific information. Various components of the system 100 and how these components may be configured for implementing the determination of the intent and the provision of the intent-specific information will now be described.

User Device

As previously mentioned, the system 100 comprises the device 104. The implementation of the device 104 is not particularly limited, but as an example, the device 104 may be implemented as a personal computer (desktops, laptops, netbooks, etc.), a wireless communication device (such as a smartphone, a cell phone, a tablet, a smart speaker and the like), as well as network equipment (such as routers, switches, and gateways). As such, the device 104 can sometimes be referred to as an "electronic device", "end user device", "client electronic device" or simply "device". It should be noted that the fact that the device 104 is associated with the user 102 does not need to suggest or imply any mode of operation—such as a need to log in, a need to be registered, or the like.

It is contemplated that the device 104 comprises hardware and/or software and/or firmware (or a combination thereof), as is known in the art, in order (i) to detect or capture the spoken user utterance 150 and, in some cases, (ii) provide or reproduce the machine-generated utterance (for example, in response to the captured the spoken user utterance 150). For example, the device 104 may comprise one or more microphones for detecting or capturing the spoken user utterance 150 and one or more speakers for providing the machine-generated utterance indicative of the intent-specific information.

Naturally, it is contemplated that the device 104 is configured to generate a digital audio signal 155 representative of the spoken user utterance 150 upon its detection or capturing. Generally speaking, a given digital audio signal is representative of soundwaves which have been detected/captured and/or recorded and converted into a digital form. As a result, the device 104 may transmit the spoken user utterance 150 in a form of the digital audio signal 155 to other computer systems of the system 100. For example, the device 104 may be configured to generate a data packet 160 comprising information indicative of the digital audio signal 155 and may transmit the data packet 160 to the other computer systems of the system 100.

In some embodiments, the device 104 also comprises hardware and/or software and/or firmware (or a combination thereof), as is known in the art, in order to execute an intelligent personal assistant (IPA) application. Generally speaking, the purpose of the IPA application, also known as a "chatbot", is to (i) enable the user 102 to "communicate" with the device 104 by means of speech, such as the spoken user utterance 150 and, in response, (ii) provide to the user 102 information by means of machine-generated speech, such as the machine-generate utterance.

It should be noted that, in some embodiments of the present technology, the device 104 may also be configured to execute at least some functions, procedures or other computational processes of a server 106 of the system 100. The at least some functions, procedures or other computational processes of the server 106 that may be executed by the device 104 will become apparent from the description herein below.

Communication Network

In the illustrative example of the system 100, the device 104 is communicatively coupled to a communication network 110 for accessing and transmitting data packets (such as the data packet 160, for example) to/from the server 106 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

Server

As previously mentioned, the system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 is configured to:
acquire data associated with the spoken user utterance 150, such as the information indicative of the digital audio signal 155;
determine speech units of the spoken user utterance 150 based on the acquired data;
generate, for each speech unit, a respective enhanced feature vector indicative of (i) textual features and (ii) acoustic features of the respective speech unit; and
determine the intent of the spoken user utterance 150 based on the enhanced feature vectors associated with the speech units.

To that end, the server 106 hosts an IPA service 108 associated with the IPA application of the device 104. It should be noted that, in some embodiments of the present technology, the server 106 may be configured to execute additional functions, procedures or computational processes to those non-exhaustively and generally summarized above for ease of illustration, without departing from the scope of the present technology.

The IPA service 108 is configured to execute a plurality of computer-implemented procedures such as: a speech-to-text analysis 300, a textual feature vector generation procedure 400, an acoustic feature vector generation procedure 500, an enhanced feature vector generation procedure 700 and an intent determination procedure 800. How the IPA service 108 may execute the plurality of computer-implemented procedures based on the digital audio signal 155 will be described further below with reference to FIGS. 2 to 8.

However, it should be noted that the IPA service 108 implements various components, such as one or more machine learning algorithms (MLAs), in order to execute at least some of the plurality of computer-implemented procedures.

Machine Learning Algorithms (MLAs)

Generally speaking, MLAs can learn from and make predictions on data. MLAs are usually used to first build a model based on training inputs of data in order to then make data-driven predictions or decisions expressed as outputs, rather than following static computer-readable instructions.

MLAs are commonly used in speech-to-text analyzes, word embedding procedures and the like.

It should be understood that different types of MLAs having different structures or topologies may be used for various tasks. One particular type of MLAs includes neural networks (NN).

Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine a complex statistical arrangements or mathematical algorithms for a given situation; the given NN tries to provide an "intuitive" answer based on a "feeling" for a situation. The given NN is thus a kind of a trained "black box", which can be used in a situation when what is in the "box" is unimportant; it is only important that the "box" provide reasonable answers to given inputs.

NNs are commonly used in many such situations where it is only important to know an output based on a given input, but exactly how that output is derived is of lesser importance or is unimportant. For example, NNs are commonly used to optimize the distribution of web-traffic between servers and in data processing, including filtering, clustering, signal separation, compression, vector generation and the like.

It should be understood that NNs can be classified into various classes of NNs and one of these classes comprises recurrent neural networks (RNNs). These particular NNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs comprise Long Short-Term Memory (LSTM) networks, Gated Recurrent Units (GRUs), Bidirectional RNNs (BRNNs) and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. RNNs having particular gated mechanisms are referred to as GRUs. Unlike LSTM networks, GRUs lack "output gates" and, therefore, have fewer parameters than LSTM networks. BRNNs may have "hidden layers" of neurons that are connected in opposite directions which may allow using information from past as well as future states.

To summarize, the implementation of a given MLA by the IPA service 108 can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase.

In some embodiments of the present technology, it is contemplated that the given MLA implemented by the IPA service 108 may in itself include various MLAs. For example, the given MLA implemented by the IPA service 108 may include a RNN 850 and a plurality of MLAs 852 as depicted in FIG. 1. Naturally, the implementation of the RNN 850 and of the plurality of MLAs 852 can be broadly categorized into training phases of the RNN 850 and of each one of the plurality of MLAs 852 and into in-use phases of the RNN 850 and of each one of the plurality of MLAs 852.

As a result, the RNN 850 and each one of the plurality of MLAs 852 may be adapted (trained) for a respectively dedicated computer-implemented procedure of the IPA service 108. For example, the in-use phase of the RNN 850 may correspond to the execution of the intent determination procedure 800 of the IPA service 108. In another example, the in-use phases of the plurality of MLAs 852 correspond to the execution of at least some other of the plurality of computer-implemented procedures of the IPA service 108. How the RNN 850 is trained and used for executing the intent determination procedure 800 of the IPA service 108 and how the plurality of MLAs 852 are trained and used for executing the at least some other computer-implemented procedures of the IPA service 108 will be described in greater detail further below.

It should be noted that, although some embodiments of the present technology are described herein using the RNN 850 for execution of the intent determination procedure 800, other NNs with other architectures may be used in other embodiments of the present technology, such as transformer NNs architectures, for example, without departing from the scope of the present technology.

Processing Database

Returning to the description of FIG. 1, the server 106 is also communicatively coupled to a processing database 124. In the depicted illustration, the processing database 124 is depicted as single physical entity. This does not need to be so in each and every embodiment of the present technology. As such, the processing database 124 may be implemented as a plurality of separate databases. Optionally, the processing database 124 may be split into several distributed storages.

The processing database 124 is configured to store information extracted or otherwise determined or generated by the server 106 during processing. Generally speaking, the processing database 124 may receive data from the server 106 which was extracted or otherwise determined or generated by the server 106 during processing for temporary and/or permanent storage thereof and may provide stored data to the server 106 for use thereof.

It is contemplated that the processing database 124 may also store training data for training the RNN 850 and at least some of the plurality of MLAs 852. For example, the training data may comprise a collection of previous digital audio signals representing previous spoken user utterances. For example, the processing database 124 may store a large number of previous digital audio signals such as 10000, 100000, 1000000 and the like. How the previous digital audio signals have been collected and stored in the processing database 124 is not particularly limiting. However, just as examples, the previous digital audio signals can be recorded by human-assessors or crow-sourced.

However, in addition to the collection of the previous digital audio signals, the training data stored in the processing database 124 may further include human-assessed data that is associated with the previous digital audio signals. The human-assessed data may comprise information indicative of (i) human-assessed speech units for respective previous digital audio signals and (ii) human-assessed intents associated with respective previous spoken user utterances recorded in the form of the respective previous digital audio signals.

Generally speaking, a given speech unit of a given spoken user utterance may be associated with (i) a given word that has been "uttered" as part of the given spoken user utterance or (ii) a given pause between the "uttered" words.

For example, a given human assessor may listen to the given spoken user utterance reproduced based on the respective previous digital audio signal. Let it be assumed that the given human assessor hears "What is Kombucha". In this case, the human assessor may identify five different speech units being (i) the word "What", (ii) the word "is", (iii) the word "Kombucha", (iv) the pause between the words "What" and "is" and (v) the pause between the words "is" and "Kombucha". It should be understood that the speech units associated with words may be identified by the human assessor by listening to the given spoken user utterance, while speech units associated with pauses may be identified or otherwise deduced by the human assessor as intervals between the words.

As a result, the given human assessor may (i) identify segments of the respective previous digital audio signal that correspond to words "uttered" as part of the given previous spoken user utterance and (ii) provide textual data representative of those words. By the same token, segments of the respective previous digital audio signal that correspond to pauses may be identified or otherwise deduced as segments of the respective previous digital audio signal that are positioned between (e.g., bordered by) segments of the respective previous digital audio signal that correspond to words.

Therefore, each human-assessed speech unit of a given previous digital audio signal is associated with (i) either a word or a pause in the respective previous spoken user utterance and (ii) a respective segment of the given previous digital audio signal. Additionally, if a given human-assessed speech unit is associated with a given word, the human assessed speech unit is also associated with textual data representative of that given word.

It is contemplated that the human-assessed speech units may be stored in the processing database 124 in association with the respective previous digital audio signal. It is also contemplated that the speech units may be stored in an ordered manner or, in order words, with an indication of positions of their respective segments of the previous digital audio signal in the previous digital audio signal (e.g., in the order in which they occurred in the previous spoken user utterance).

As previously mentioned, in addition to human-assessed speech units, the human-assessed data may also comprise information indicative of human-assessed intents associated with respective previous spoken user utterances recorded in the form of respective previous digital audio signals. As previously alluded to, a given human assessor (as a human being) is very effective and efficient in determining intents associated with spoken user utterances and, therefore, may identify a given human-assessed intent associated with the given spoken user utterance. For example, the human assessor may identify that the intent associated with a given previous spoken user utterance is one of a pre-determined list of possible types of intent comprising: an open-ended question type, a closed-ended question type, a statement type, an exclamation type. It is contemplated that the predetermined list of possible types of intent from which the human assessor may select a given type of intent to be associated with the given previous spoken user utterance may comprise other types of intent to those non-exhaustively listed above.

Alternatively, the human assessors may be asked to record a respective previous spoken user utterance with a specific prescribed intent, such as record the respective previous spoken user utterance as a question, record the respective previous spoken user utterance as a statement, etc.

How various computer-implemented procedures of the server 106 are executed in combination for determining the intent of the spoken user utterance 150 will now be described in more details with reference to FIG. 2.

Figure 2:
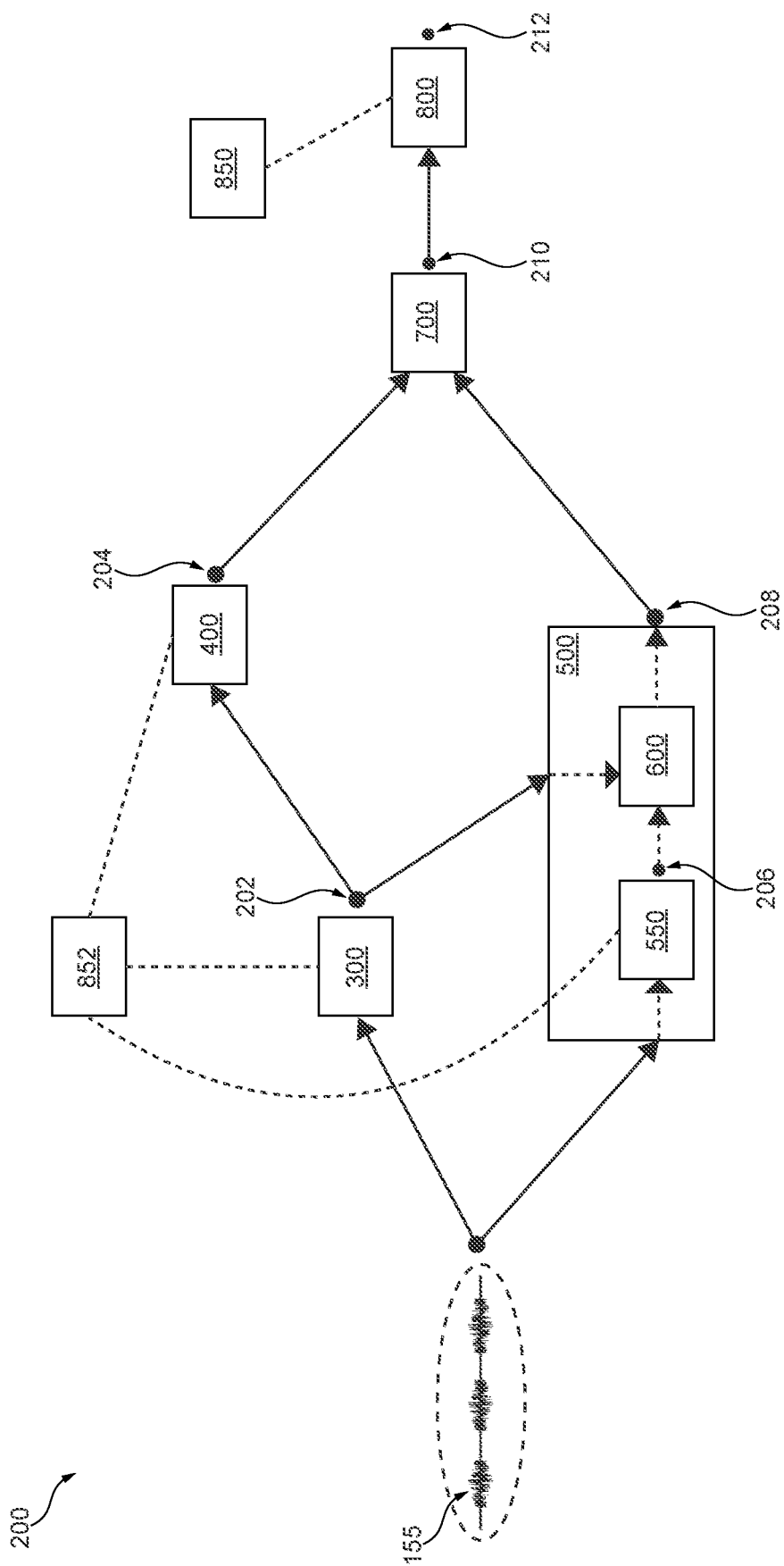
FIG. 2 is a schematic illustration of inputs and outputs of at least some computer-implemented procedures executed by the server of FIG. 1 according to some embodiments of the present technology.

FIG. 2 depicts a schematic illustration 200 outlining the processing of the digital audio signal 155 by the IPA service 108 of the server 106. More specifically, the illustration 200 shows inputs and outputs of various computer-implemented procedures of the IPA service 108 for determining the intent of the spoken user utterance 150 of the user 102.

Let it be assumed that the digital audio signal 155 (representative of the spoken user utterance 150) has been acquired by the server 106. For example, as previously mentioned, the digital audio signal 155 may have been acquired via the data packet 160 transmitted by the device 104 over the communication network 110. In some embodiments, the server 106 may also store the data/information indicative of the digital audio signal 155 in the processing database 124.

Once the server 106 acquires the information indicative of the digital audio signal 155, the server 106 may be configured to execute the speech-to-text analysis 300 on the digital audio signal 155 thereby generating a speech-to-text output 202 of the speech-to-text analysis 300. Generally speaking, the server 106 may execute the speech-to-text analysis 300 on the digital audio signal 155 in order to determine speech units of the spoken user utterance 150.

As previous alluded to, a given speech unit of the spoken user utterance 150 may be associated with (i) a given word that the user 102 "uttered" as part of the spoken user utterance 150 or (ii) a given pause between "uttered" words being part of the spoken user utterance 150. Put another way, the speech-to-text analysis 300 of the digital audio signal 155 may allow determining:
  a textual representation of "uttered" word(s) in the spoken user utterance 150; and
  segments of the digital audio signal 155 that respectively correspond (i) to the "uttered" word(s) and (ii) to pause(s) between the "uttered" word(s) in the spoken user utterance 150.

It is contemplated that the server 106 may employ one of the plurality of MLAs 852 for performing the speech-to-text analysis 300. For example, the server 106 may employ an automatic speech recognition (ASR) algorithm for performing the speech-to-text analysis 300.

The ASR algorithm may have been trained, during its training phase, based on (i) the previous digital audio signals and (ii) the respectively associated human-assessed speech units stored in the processing database 124. For example, as part of a single training iteration of the ASR algorithm, a given previous digital audio signal may be inputted therein and a training output may be generated by the "untrained" ASR algorithm. This training output may then be compared to the respectively associated human-assessed speech units in order to adjust the ASR algorithm for outputting speech units that are as similar as possible to the respective human-assessed speech units.

How the server 106 performs the speech-to-text analysis 300 on the digital audio signal 155 in order to generate the speech-to-text output 202 (e.g., speech units of the spoken user utterance 150) will be described in greater detail herein below with reference to FIG. 3. It is contemplated however that, in some embodiments of the present technology, the speech-to-text analysis 300 may be executed on the digital audio signal by the device 104 and the speech-to-text output 202 may be transmitted to the server 106 over the communication network 110 via the data packet 160 or via additional data packet(s).

The server 106 is also configured to perform the textual feature vector generation procedure 400 on the speech-to-text output 202, thereby generating a textual feature vector output 204 of the textual feature vector generation procedure 400. Generally speaking, the server 106 may perform the textual feature vector generation procedure 400 on the speech-to-text output 202 in order to (i) determine textual features of each speech unit of the spoken user utterance 150 and (ii) generate a respective textual feature vector for each speech unit based on the respective textual features.

It is contemplated that the server 106 may employ one of the plurality of MLAs 852 for performing the textual feature vector generation procedure 400. For example, the server 106 may employ a word embedding algorithm for performing the textual feature vector generation procedure 400. Generally speaking, word embedding refers to language modelling and textual feature learning techniques in natural language processing (NLP). It can be said that, as part of word embedding, textual data representative of words is mapped to respective textual feature vectors that are indicative of respective textual features of respective words.

It is contemplated that the textual data representative of pauses is either absent or considered by the server 106 as null. As a result, it can be said that performing the textual feature vector generation procedure 400 on a given speech unit associated with a pause may result in the generation of a respective textual feature vector being null.

Alternatively, instead of generating a respective textual feature vector that is null for each speech unit associated with a pause, it is contemplated that the server 106, upon determining that a given speech unit is associated with a pause may retrieve, for association with the given speech unit, a pre-defined/pre-generated null vector from the processing database 124. In other words, textual feature vectors for speech units associated with pauses do not need to be generated during the textual feature vector generation procedure 400 per se, but can be alternatively previously stored in the processing database 124 and retrieved upon determination that a given speech unit is associated with a pause.

It should be noted that, although the textual feature vector generation procedure 400 is described herein as being performed by a given MLA of the plurality of MLAs 852, it is contemplated that the server 106 may employ a dedicated NN having been trained to perform word embedding, instead of employing the given MLA of the plurality of MLAs 852, is some embodiments of the present technology and without departing from the scope of the present technology. In these embodiments of the present technology, the given MLA of the plurality of MLAs 852 may be omitted from the system architecture.

How the server 106 executes the textual feature vector generation procedure 400 in order to generate the textual feature vector output 204 (e.g. respective textual features vectors of the speech units of the spoken user utterance 150) will be described in greater detail herein further below with reference to FIG. 4. It is contemplated however that, in some embodiments of the present technology, the textual feature vector generation procedure 400 may be executed by the device 104 and the textual feature vector output 204 may be transmitted to the server 106 over the communication network 110 via the data packet 160 or via additional data packet(s).

The server 106 is further configured to execute an acoustic feature vector generation procedure 500 based on (i) the information indicative of the digital audio signal 155 and (ii) the speech-to-text output 202. It is contemplated that, in some embodiments of the present technology, the acoustic feature vector generation procedure 500 includes (i) an intermediary acoustic feature vector generation procedure 550 and (ii) a statistical aggregation procedure 600.

More specifically, the server 106 may execute the intermediary acoustic feature vector generation procedure 550 on the digital audio signal 155 thereby generating an intermediary output 206. Generally speaking, the server 106 may perform the intermediary acoustic feature vector generation procedure 550 on the digital audio signal 155 in order to (i) determine acoustic features of sub-segments of the digital audio signal 155 and (ii) generate a respective intermediary acoustic feature vector for each sub-segment of the digital audio signal 155 based on the respective acoustic features.

It is contemplated that acoustic features may be indicative of: volume level, pitch level, energy level, harmonicity (e.g., autocorrelation of pitch), tempo (e.g., number of phonemes per time unit), spectral features and the like. It is contemplated that at least some of the above non-exhaustive list of acoustic features may be extracted via signal treatment algorithms.

As it will be described below with reference to FIG. 5, it is contemplated that sub-segments of the digital audio signal 155, for which respective intermediary acoustic feature vectors are generated, are shorter in time length than the segments of the digital audio signal 155 corresponding to respective speech units. In other words, a given sub-set of sub-segments of the digital audio signal 155, for which respective intermediary acoustic feature vectors are generated, may be associated with time intervals that fall within the time interval of a single segment of the digital audio signal 155 corresponding to a given speech unit.

How the server 106 executes the intermediary acoustic feature vector generation procedure 550 in order to generate the intermediary output 206 (e.g., intermediary acoustic feature vectors of sub-segments of the digital audio signal) will be described in greater herein further below detail with reference to FIG. 5. It is contemplated however that, in some embodiments of the present technology, the intermediary acoustic feature vector generation procedure 550 may be executed by the device 104 and the intermediary output 206 may be transmitted to the server 106 over the communication network 110 via the data packet 160 or via additional data packet(s).

The server 106 is also configured to execute the statistical aggregation procedure 600 based on (i) the speech-to-text output 202 and (ii) the intermediary output 206, thereby generating the acoustic feature vector output 208 of the acoustic feature vector generation procedure 500. Generally speaking, the server 106 may execute the statistical aggregation procedure 600 in order to generate a respective acoustic feature vector for each speech unit of the spoken user utterance 150 based on the intermediary acoustic feature vectors associated with sub-segments of the digital audio signal 155. For example, a given acoustic feature vector may be generated for a given speech unit based on intermediary acoustic feature vectors associated with sub-segments that correspond to the segment of the digital audio signal 155 of the given speech unit as previously mentioned.

How the server 106 executes the statistical aggregation procedure 600 in order to generate the acoustic feature vector output 208 (e.g., the acoustic feature vectors of respective speech units of the spoken user utterance 150) will be described in greater detail herein further below with reference to FIG. 6. It is contemplated however that, in some embodiments of the present technology, the statistical aggregation procedure 600 may be executed by the device 104 and the acoustic feature vector output 208 may be transmitted to the server 106 over the communication network 110 via the data packet 160 or via additional data packet(s).

The server 106 is also configured to execute the enhanced feature vector generation procedure 700 based on (i) the textual feature vector output 204 (e.g., the textual feature vectors of respective speech units of the spoken user utterance 150) and (ii) the acoustic feature vector output 208 (e.g., the acoustic feature vectors of respective speech units of the spoken user utterance 150), thereby generating an enhanced feature vector output 210. Generally speaking, the server 106 may generate an enhanced feature vector for each speech unit by combining the information of (i) a respective textual feature vector and (ii) a respective acoustic feature vector.

How the server 106 executes the enhanced feature vector generation procedure 700 in order to generate the enhanced feature vector output 210 (e.g., the enhanced feature vectors of respective speech units of the spoken user utterance 150) will be described in greater detail herein further below with reference to FIG. 7. It is contemplated however that, in some embodiments of the present technology, the enhanced feature vector generation procedure 700 may be executed by the device 104 and the enhanced feature vector output 210 may be transmitted to the server 106 over the communication network 110 via the data packet 160 or via additional data packet(s).

The server 106 is also configured to execute the intent determination procedure 800 on the enhanced feature vector output 210 of the enhanced feature vector generation procedure 700 in order to generate an output 212 being a probability of the intent of the spoken user utterance 150 being of a given type.

As previously mentioned, the server 106 may employ the RNN 850 in order to perform the intent determination procedure 800. Also as previously mentioned, in order to employ the RNN 850 during its in-use phase, the RNN 850 must have been previously trained during its training phase.

The RNN 850 may have been trained, during its training phase, based on (i) previous enhanced feature vectors associated with speech units of previous spoken user utterances associated with previous digital audio signals and (ii) human-assessed intents of the previous spoken user utterances. The previous enhanced feature vectors may have been generated based on the respective human-assessed speech units, similarly to how the enhanced feature vectors associated with speech units of the spoken user utterance 150 have been generated.

For example, as part of a single training iteration of the RNN 850, previous enhanced feature vectors associated with a given previous spoken user utterance may be inputted therein and a training output may be generated by the "untrained" RNN 850. This training output may then be compared to the human-assessed intent of the given previous spoken user utterance in order to adjust the RNN 850 for outputting a high probability of the given previous spoken user utterance to be associated with the respective human-assessed intent.

The RNN 850 may be trained to estimate a probability of an intent of a given spoken user utterance to be of a given type. Let it be assumed that the given type is the open-ended question type, even though in other embodiments of the present technology it is contemplated that the given type may be another type of intent. For example, during training of the RNN 850, if the human-assessed intent of a given previous spoken user utterance is of the open-ended question type, the training set associated with the given previous spoken user utterance may be labelled as a positive example for the RNN 850. In another example, during training of the RNN 850, if the human-assessed intent of a given previous spoken user utterance is of any other type than the given type (e.g., any other type that is not the open-ended question type), the training set associated with the given previous spoken user utterance may be labelled as a negative example for the RNN 850. As a result, during the in-use phase, the RNN 850 may be employed to estimate the probability of a given (in-use) spoken user utterance to be of the given type (e.g., the open-ended question type).

How the server 106 performs the intent determination procedure 800 (e.g., the in-use phase of the RNN 850) in order to generate the output 212 will be described in greater detail herein further below with reference to FIG. 8.

It should be noted that the schematic illustration 200 that outlines processing of the digital audio signal 155 by the IPA service 108 is a simplified representation of the actual processing of the digital audio signal 155 by the IPA service 108 and has been depicted as such for sake of simplicity only. It is however contemplated that the processing of the digital audio signal 155 by the IPA service 108 may comprise additional functions, procedures or additional computational processes to those shown in the schematic illustration 200, as it will become apparent from the description herein below, without departing from the scope of the present technology.

The speech-to-text analysis 300, the textual feature vector generation procedure 400, the acoustic feature vector generation procedure 500, the enhanced feature vector generation procedure 700 and the intent determination procedure 800 will now be described in turn with reference to FIGS. 3 to 8.

Figure 3:
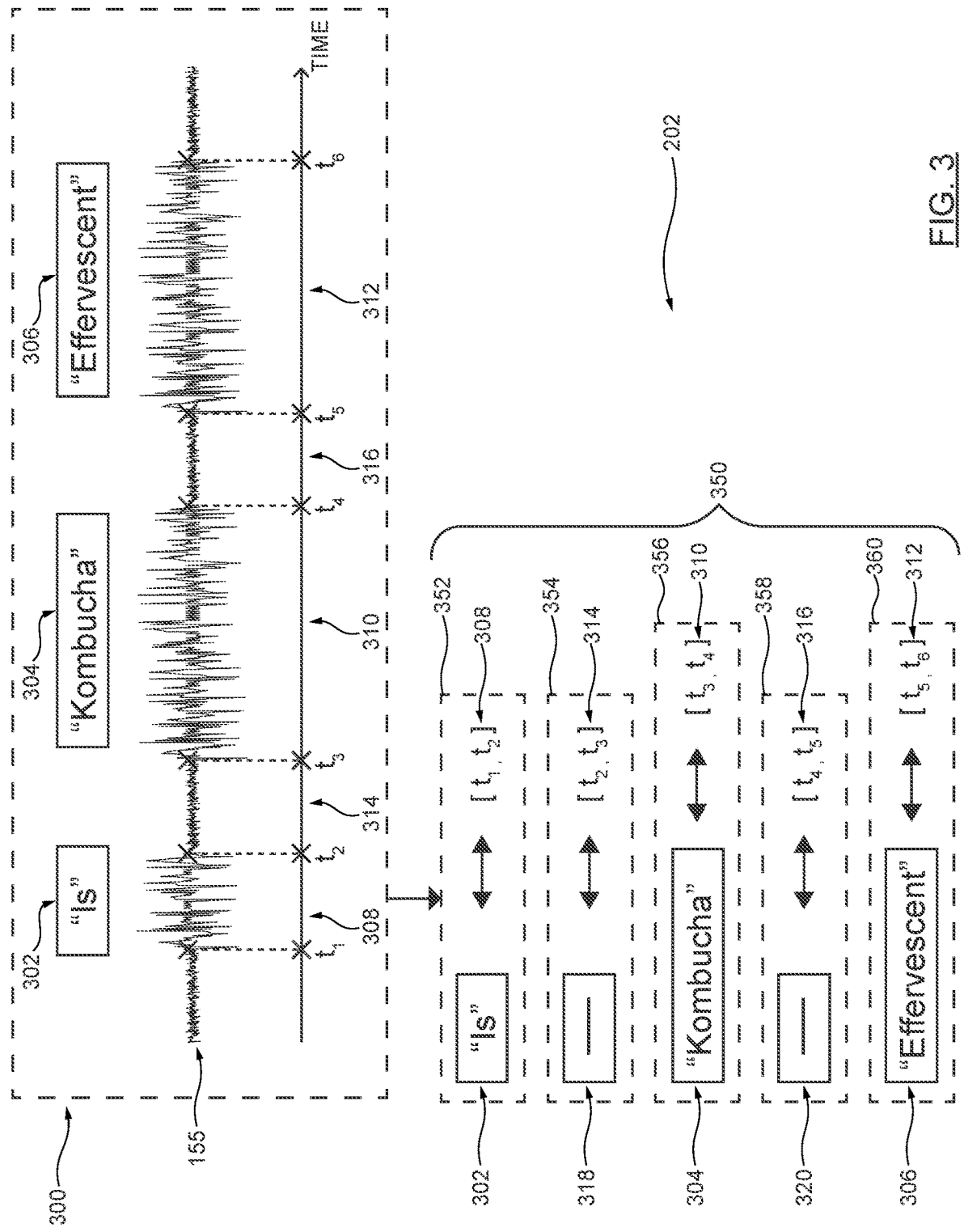
FIG. 3 is a schematic illustration of a speech-to-text analysis for determining speech units of a spoken user utterance according to some embodiments of the present technology.

With reference to FIG. 3, the speech-to-text analysis 300 executable by the server 106 will now be described in greater detail. As previously mentioned, the server 106 may execute the speech-to-text analysis 300 on the digital audio signal 155 in order to determine speech units of the spoken user utterance 150.

Let it be assumed, that during the execution of the speech-to-text analysis 300, the server 106 determines the presence of three words in the digital audio signal 155 based on segments 308, 310 and 312 of the digital audio signal 155. In other words, the server 106 may determine textual data 302, 304 and 306 representative of each one of the three words, being "Is", "Kombucha" and "Effervescent", respectively, and respectively associated with the segments 308, 310 and 312 of the digital audio signal 155.

It should be noted that the server 106 may determine time intervals for each one of the segments 308, 310 and 312 of the digital audio signal 155. For example, the server 106 may determine that the segment 308 is associated with a time interval defined between $t_1$ and $t_2$. In another example, the server 106 may determine that the segment 310 is associated with a time interval defined between $t_3$ and $t_4$. In yet a further example, the server 106 may determine that the segment 312 is associated with a time interval defined between $t_5$ and $t_6$. It is contemplated that the server 106 may associate the time intervals of the segments 308, 310 and 312 respectively with the textual data 302, 304 and 306.

In addition, the server 106 may determine the presence of two pauses in the spoken user utterance 150 based on the digital audio signal 155. In one embodiment, the server 106 may determine the presence of the two pauses in the digital audio signal 155 based on the segments 314 and 316 of the digital audio signal 155. Alternatively, in another embodiment, the server 106 determining the presence of the two pauses in the digital audio signal 155 may comprise identifying or otherwise deducing the presence of the two pauses based on the segments 308, 310 and 312 of the digital audio signal 155. Indeed, the server 106 may deduce that segments of the digital audio signal 155 which are (i) complementary to the segments 308, 310 and 312 and (ii) bordered by two of the segments 308, 310 and 312 of the digital audio signal 155 are segments of the digital audio signal 155 associated with pauses.

In any case, it is contemplated that the server 106 may identify, determine or otherwise deduce the presence of the two pauses, being a first pause between the words "Is" and "Kombucha" and a second pause between the words "Kombucha" and "Effervescent".

Naturally, the server 106 may associate the segments 314 and 316 with the corresponding first and second pauses. In addition, the server 106 may associate a time interval defined between $t_2$ and $t_3$ with the first pause and the time interval defined between $t_4$ and $t_5$ with the second pause.

In some embodiments of the present technology, the server 106 may determine textual data 318 representative of the first pause and the textual data 320 representative of the second pause. It goes without saying that the textual data 318 and 320 may be representative of a space or any other marker indicative of a pause. In another embodiment, the textual data 318 and 320 may be representative of a null value or any character representative of a null value.

In other embodiments of the present technology, the server 106 may not be configured to determine any textual data to be associated with pauses at all. Indeed, the server 106 may mark or otherwise identify the corresponding segments 314 and 316 as being associated with pauses, without explicitly determining any textual data to be associated therewith.

As a result of the execution of the speech-to-text analysis 300, the server 106 determines the speech-to-text output 202 comprising a plurality of speech units 350. More specifically and using this example, the plurality of speech units 350 comprises:

a first speech unit 352 having (i) textual data 302 representative of the word "Is" and (ii) the corresponding segment 308 of the digital audio signal 155 associated with the time interval defined between $t_1$ and $t_2$;

a second speech unit 354 having (i) textual data 318 representative of the first pause and (ii) the corresponding segment 314 of the digital audio signal 155 associated with the time interval defined between $t_2$ and $t_3$;

a third speech unit 356 having (i) textual data 304 representative of the word "Kombucha" and (ii) the corresponding segment 310 of the digital audio signal 155 associated with the time interval defined between $t_3$ and $t_4$;

a fourth speech unit 358 having (i) textual data 320 representative of the second pause and (ii) the corresponding segment 316 of the digital audio signal 155 associated with the time interval defined between $t_4$ and $t_5$; and a fifth speech unit 360 having (i) textual data 306 representative of the word "Effervescent" and (ii) the corresponding segment 312 of the digital audio signal 155 associated with the time interval defined between $t_5$ and $t_6$.

It should be understood that, in some embodiments of the present technology, the second and fourth speech unit 354 and 358 may not have any textual data per se and, instead, may have a marker or some type of identifier that marks or identifies the corresponding segments 314 and 316 as being associated with the first and the second pause, respectively.

It is contemplated that the time intervals of the corresponding segments 308, 314, 310, 316 and 312 may be indicative of a temporal order of the speech units as they occurred in the spoken user utterance 150. In other words, the time intervals of the corresponding segments 308, 314, 310, 316 and 312 may be indicative of the following temporal order of speech units: the first speech unit 352 occurred first, then the second speech unit 354 occurred, the third speech unit 356 occurred, then the fourth speech unit 358 occurred and the fifth speech unit 360 occurred last in the spoken user utterance 150.

In summary, it can be said that the speech-to-text analysis 300, when executed by the server 106 on the digital audio signal 155, allows determining various segments of the digital audio signal 155, such as the segments 308, 314, 310, 316 and 312, and their associations with (i) respective time intervals and (ii) respective textual data associated with words or pauses, as described above with reference to FIG. 3.

It is contemplated that the server 106 may be configured to store the plurality of speech units 350 in association with the digital audio signal 155 in the processing database 124 for future use thereof.

As previously mentioned, the server 106 is configured to execute the textual feature vector generation procedure 400 (see FIG. 2) and the acoustic feature vector generation procedure 500 (see FIG. 2). How the server 106 is configured to execute the textual feature vector generation procedure 400 and the acoustic feature vector generation procedure 500 will now be described in turn.

Figure 4:
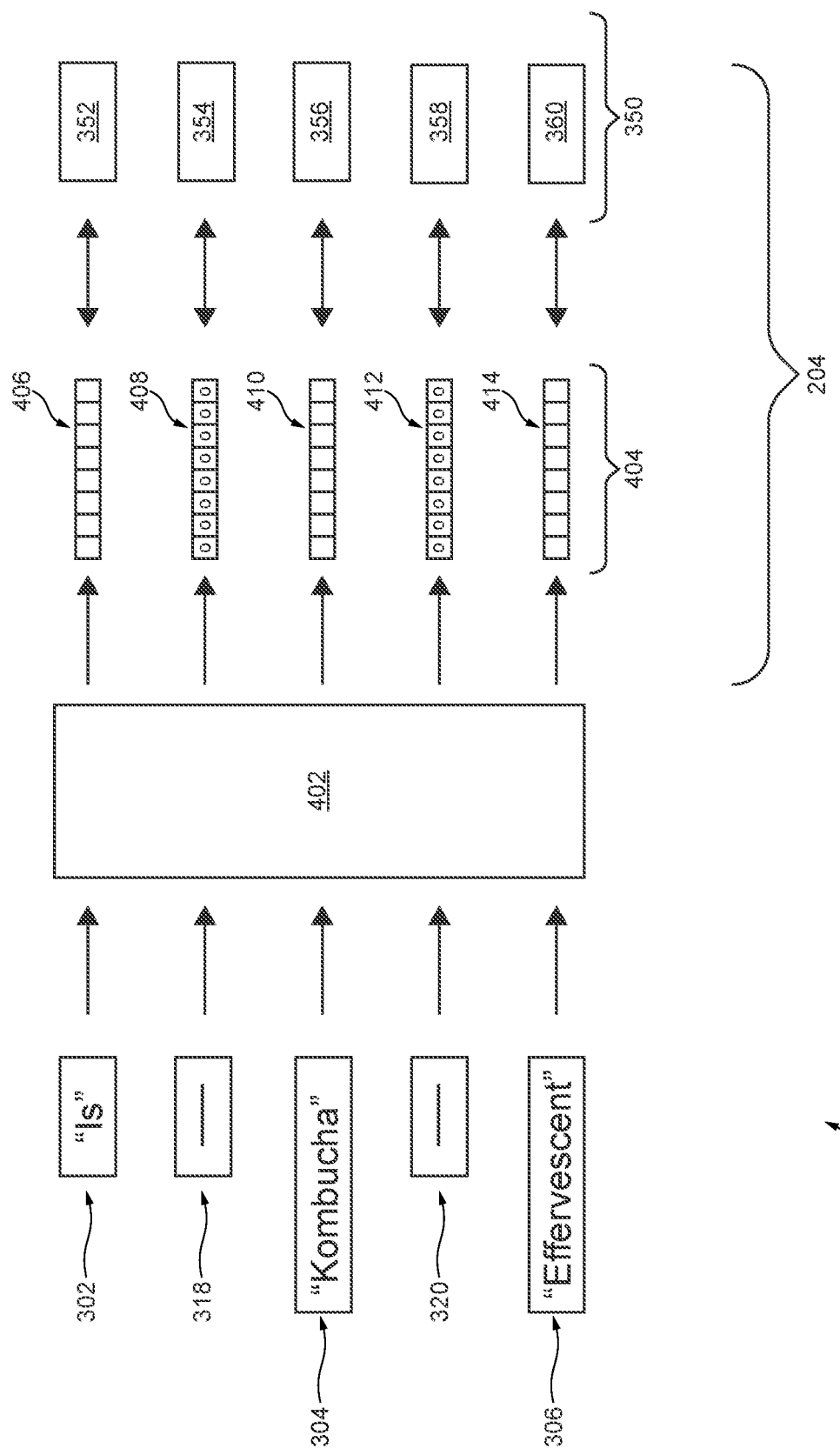
FIG. 4 is a schematic illustration of a textual feature vector generation procedure according to some embodiments of the present technology.

With reference to FIG. 4, there is depicted the textual feature vector generation procedure 400 being executed by the server 106 on the speech-to-text output 202. As previously mentioned, the server 106 may execute a word embedding algorithm 402 in order to generate a plurality of textual feature vectors 404. It is contemplated that the word embedding algorithm 402 may be executed by the server 106 employing a given one of the plurality of MLAs 852 or alternatively a dedicated NN having been trained to perform word embedding, without departing from the scope of the present technology.

The server 106 is configured to provide the textual data 302, 318, 304, 320 and 306 representative of the words and pauses of the spoken user utterance 150 as input for the word embedding algorithm 402. For each one of the textual data 302, 318, 304, 320 and 306, the word embedding algorithm 402 is configured to (i) determine textual features of each respective one of the plurality of speech units 350 and (ii) generate a respective textual feature vector for each one of the plurality of speech units 350.

More specifically, by executing the textual feature vector generation procedure 400, the server 106 is configured to generate:

based on the textual data 302, a first textual feature vector 406 associated with the first speech unit 352;

based on the textual data 318, a second textual feature vector 408 associated with the second speech unit 354;

based on the textual data 304, a third textual feature vector 410 associated with the third speech unit 356;

based on the textual data 320, a fourth textual feature vector 412 associated with the fourth speech unit 358; and based on the textual data 306, a fifth textual feature vector 414 associated with the fifth speech unit 360.

It is contemplated that in some embodiments of the present technology, the second and the fourth textual feature vector 408 and 412 may be null vectors. In other words, the second and the fourth textual feature vector 408 and 412 may have the same dimensionality as the first, the third and the fifth textual feature vector 406, 410 and 414 and filled with null values.

In other embodiments of the present technology, it is contemplated that the server 106 may be configured to generate textual feature vectors only for speech units that are associated with words. In other words, the server 106 may be configured to generate the first, the third and the fifth textual feature vector 406, 410 and 414 only and automatically assign null vectors as textual feature vectors for speech units associated with pauses. This means, that in some embodiments of the present technology, where the server 106 has not been configured to generate the textual data 318 and 320 representative of pauses, the server 106 may automatically assign null vectors as textual feature vectors for the second and the fourth speech unit 354 and 358 based on the marker or any other type of indications that the second and the fourth speech unit 354 and 358 are associated with pauses.

As a result of the execution of the textual feature vector generation procedure 400, the server 106 generates the textual feature vector output 204 that includes a plurality of textual feature vectors 404 respectively associated with the plurality of speech units 350. It is contemplated that the server 106 may be configured to store the plurality of textual feature vectors 404 (e.g., the first, the second, the third, the fourth and the fifth textual feature vector 406, 408, 410 412 and 414) in association with the respective ones of the plurality of speech units 350 in the processing database 124 for future use thereof.

The server 106 is also configured to execute the acoustic feature vector generation procedure 500. As previously mentioned, the acoustic feature vector generation procedure 500 may include (i) the intermediary acoustic feature vector generation procedure 550 and (ii) the statistical aggregation procedure 600, which will now be described with reference to FIGS. 5 and 6.

Figure 5:
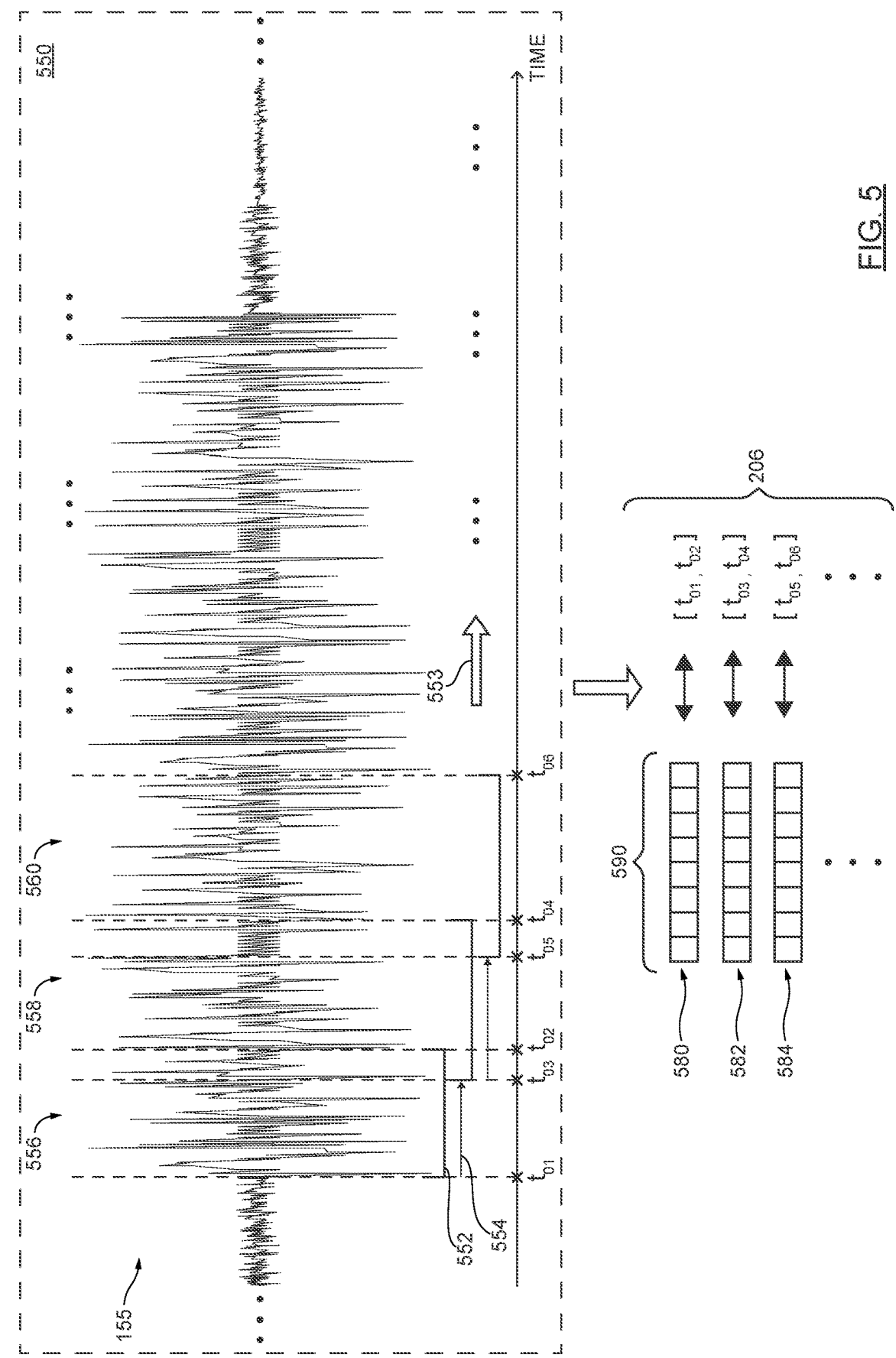
FIG. 5 is a schematic illustration of an intermediary acoustic feature vector generation procedure according to some embodiments of the present technology.

FIG. 5 depicts the intermediary acoustic feature vector generation procedure 550 executed by the server 106 on the digital audio signal 155. During the intermediary acoustic feature vector generation procedure 550, the digital audio signal 155 may be segmented by a sliding window 552 applied thereto by the server 106, which slides with a time step 554 along the digital audio signal 155 in the direction of an arrow 553. The sliding window 552 may be of a pre-determined time length, such as 25 milliseconds, for example; and the time step 554 according to which the sliding window 552 slides may be of a pre-determined time length, such as 10 milliseconds, for example.

The sliding window 552 segments the digital audio signal 155 into a plurality of sub-segments that comprises inter alia a first sub-segment 556, a second sub-segment 558 and a third sub-segment 560. It should be understood that the sliding window 552 segments the digital audio signal 155 into a large number of sub-segments and that only three sub-segments are illustrated in FIG. 5 for the sake of simplicity only. It is contemplated that the number of sub-segments of the digital audio signal 155 may vary depending on inter alia the pre-determined time lengths of the sliding window 552 and of the time step 554.

Naturally, each sub-segment has a time length that is equal to the pre-determined time length of the sliding window 552. In other words:

(i) the first sub-segment 556 is associated with a time interval defined between $t_{o1}$ and $t_{o2}$, (ii) the second sub-segment 558 is associated with a time interval defined between $t_{o3}$ and $t_{o4}$; and (iii) the third sub-segment 560 is associated with a time interval defined between $t_{o5}$ and $t_{o6}$ and where the time intervals of each one of the first, second and the third sub-segment 556, 558 and 560 are equal to the pre-determined time length of the sliding window 552.

It is contemplated that the pre-determined time length of the sliding window 552 and the pre-determined time length of the time step 554 may vary depending on inter alia various implementations of the present technology and, therefore, time length (e.g, breadth of the time intervals) of the sub-segments of the digital audio signal 155 will also depend on inter alia various implementations of the present technology.

However, it should be noted that, in a given implementation, all sub-segments of the digital audio signal 155 (e.g., the first sub-segment 556, the second sub-segment 558 and the third sub-segment 560) have an identical time length, while the segments 308, 310, 312, 314, and 316 (see FIG. 3) corresponding to speech units of the spoken user utterance 150 may have different time lengths. Indeed, although in various implementations of the present technology the pre-determined time length of the sliding window 552 may be different, in a given implementation all of the sub-segments in that given implementation will have the same time length, which identical to the pre-determined time length of the sliding window 552 in that given implementation. However, segments corresponding to speech units may have different time lengths which do not depend on a particular implementation of the present technology per se, but rather on how fast or slow the user 102 has "uttered" the respective words of the spoken user utterance 150 and on how long or short were the pauses between the "uttered" words.

It should also be noted that the pre-determined time length of the sliding window 552 is preferably at least equal to the pre-determined time length of the time step 554. This avoids, in a sense, "loosing" acoustic information about some portions of the digital audio signal 155.

For example, if the pre-determined time length of the time step 554 is superior to the pre-determined time length of the sliding window 552, some portions of the digital audio signal 155 (in this case, the some portions are excluded portions between sub-segments which have time lengths equal to the difference between (i) the pre-determined time length of time step 554 and (ii) the pre-determined time length of the sliding window 552) will not be included in any sub-segment of the digital audio signal 155.

Therefore, it can be said that the pre-determined time length of the sliding window 552 may be either:

(i) equal to the pre-determined time length of the time step 554; or (ii) superior to the pre-determined time length of time step 554.

On the one hand, if the pre-determined time length of the sliding window 552 is equal to the pre-determined time length of the time step 554, the sub-segments of the digital audio signal 155 will be complementary (e.g., not overlapping).

On the other hand, as depicted in FIG. 5, if the pre-determined time length of the sliding window 552 is superior to the pre-determined time length of the time step 554, the sub-segments of the digital audio signal 155 will partially overlap. For example, the second sub-segment 558 partially overlaps the first sub-segment 556 and the third sub-segment 560 partially overlaps the second sub-segment 558.

It is contemplated that having partially overlapping sub-segments of the digital audio signal 155 has a special technical effect which results in avoiding "loss" of acoustic information about some portions of the digital audio signal 155 and, as it will now be described, in carrying the acoustic information about some portions of the digital audio signal 155 by two subsequent intermediary acoustic feature vectors.

During the intermediary acoustic feature vector generation procedure 550, the server 106 is configured to determine respective acoustic features of each one of the plurality of sub-segments of the digital audio signal 155 and generate respective intermediary acoustic feature vectors for each one of the plurality of sub-segments of the digital audio signal 155 based on the respective acoustic features. As previously alluded to, the server 106 may be configured to determine the acoustic features being indicative of at least some of: volume level, pitch level, energy level, harmonicity (e.g., autocorrelation of pitch), tempo (e.g., number of phonemes per time unit), spectral features and the like.

In other words, the server 106 may be configured to:
based on the acoustic features of the first sub-segment 556 of the digital audio signal 155, generate a first intermediary acoustic feature vector 580 associated with the time interval of the first sub-segment 556;
based on the acoustic features of the second sub-segment 558 of the digital audio signal 155, generate a second intermediary acoustic feature vector 582 associated with the time interval of the second sub-segment 558; and
based on the acoustic features of the third sub-segment 560 of the digital audio signal 155, generate a third intermediary acoustic feature vector 584 associated with the time interval of the third sub-segment 560.

It should be noted that, since in this case the sub-segments of the digital audio signal 155 partially overlap, the information indicative of acoustic features of overlapped portions of the digital audio signal 155 may be included in or otherwise "carried by" more than one intermediary acoustic feature vector. For example, information indicative of acoustic features of the second portion 564 may be included in or otherwise carried by the first intermediary acoustic feature vector 580 and the second intermediary acoustic feature vector 582. In another example, information indicative of acoustic features of the fourth portion 568 may be included in or otherwise carried by the second intermediary acoustic feature vector 582 and the third intermediary acoustic feature vector 584.

As a result of the intermediary acoustic feature vector generation procedure 550, the server 106 determines the intermediary output 206 comprising (i) a plurality of intermediary acoustic feature vectors 590 respectively associated with the plurality of sub-segments of the digital audio signal 155 and (ii) the time intervals of the respective ones of the plurality of sub-segments of the digital audio signal 155. It is contemplated that the server 106 may be configured to store the intermediary output 206 in association with the digital audio signal 155 in the processing database 124 for future use thereof.

Figure 6:
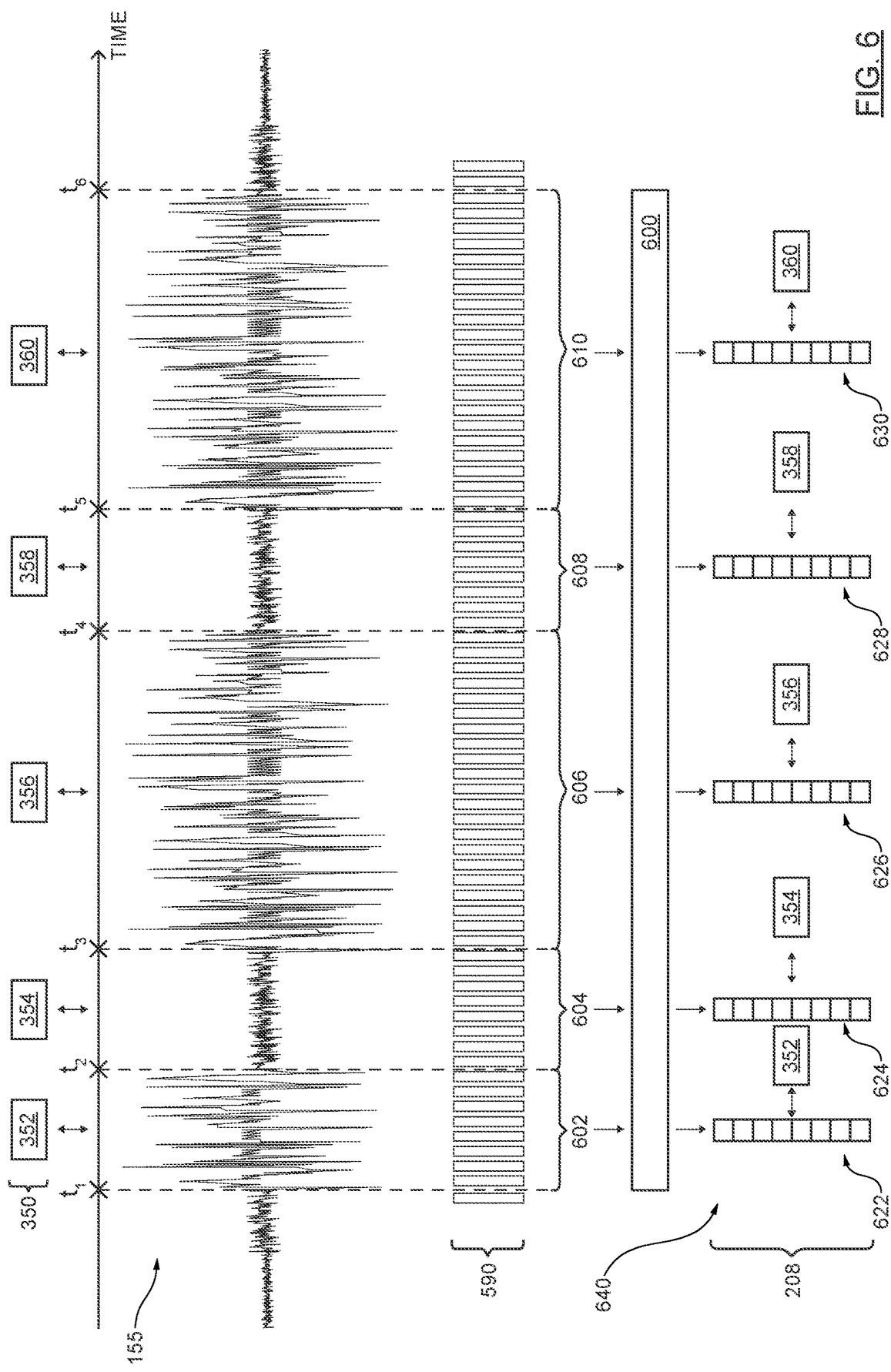
FIG. 6 is a schematic illustration of a statistical aggregation procedure for generating acoustic feature vectors according to some embodiments of the present technology.

With reference to FIG. 6, there is depicted the statistical aggregation procedure 600 executed by the server 106. The server 106 may be configured to identify which sub-sets of intermediary acoustic feature vectors associated with respective time intervals fall within the respective time intervals of each one of the plurality of speech units 350.

For example, based on the speech-to-text output 202 and the intermediary output 206, the server 106 may determine that the intermediary acoustic feature vectors in a first sub-set of intermediary acoustic feature vectors 602 are associated with respective time intervals (of the respective sub-segments of the digital audio signal 155) that fall within the time interval defined between $t_0$ and $t_1$ of the first speech unit 352 (of the corresponding segment 308 of the digital audio signal 155).

As such, it can be said that the server 106 may associate the first sub-set of intermediary acoustic feature vectors 602 with the first speech unit 352 because all of the time intervals of the sub-segments respectively associated with the first sub-set of intermediary acoustic feature vectors 602 fall within the time interval of the segment 308 corresponding to the first speech unit 352. In a similar manner, the server 106 may be configured to associate:
a second sub-set of intermediary acoustic feature vectors 604 with the second speech unit 354;
a third sub-set of intermediary acoustic feature vectors 606 with the third speech unit 356;
a fourth sub-set of intermediary acoustic feature vectors 608 with the fourth speech unit 358; and
a fifth sub-set of intermediary acoustic feature vectors 610 with the fifth speech unit 360.

It is contemplated that the first, the second, the third, the fourth and the fifth sub-set of intermediary acoustic feature vectors 602, 604, 606, 608 and 610 may not comprise identical numbers of intermediary acoustic feature vectors. Indeed, since (i) there is a respective intermediary acoustic feature vector for each sub-segment of the digital audio signal 155, (ii) all sub-segments of the digital audio signal 155 have an identical time length and (iii) the segments of the digital audio signal 155 corresponding to speech units may have different time lengths depending on how fast each speech unit was "uttered" by the user 102, a different number of intermediary acoustic feature vectors may be associated with two given segments of the digital audio signal 155 corresponding to respective speech units.

The server 106 may then execute the statistical aggregation procedure 600 in order to generate for each sub-set of intermediary acoustic feature vectors a respective acoustic feature vector. In other words, by executing the statistical aggregation procedure 600, the server 106 is configured to generate:
a first acoustic feature vector 622 based on the first sub-set of intermediary acoustic feature vectors 602 for the first speech unit 352;
a second acoustic feature vector 624 based on the second sub-set of intermediary acoustic feature vectors 604 for the second speech unit 354;
a third acoustic feature vector 626 based on the third sub-set of intermediary acoustic feature vectors 606 for the third speech unit 356;

a fourth acoustic feature vector 628 based on the fourth sub-set of intermediary acoustic feature vectors 608 for the fourth speech unit 358; and a fifth acoustic feature vector 630 based on the fifth sub-set of intermediary acoustic feature vectors 610 for the fifth speech unit 360.

It is contemplated that execution of the statistical aggregation procedure 600 by the server 106 may comprise generating a given acoustic feature vector as a statically-driven combination of a respective sub-set of intermediary acoustic feature vectors. For example, the statistical aggregation procedure 600 may take into account at least some of the following statistics: extremum (min and max) statistics, ranges of values, centroids, standard deviations, variances, skewness, kurtosis, percentiles, number of null value crossings, peak statistics, average statistics, polynomial regressions of different orders and the like.

As a result of the statistical aggregation procedure 600, the server 106 determines the acoustic feature vector output 208 including a plurality of acoustic feature vectors 640 respectively associated with the plurality of speech units 350. It is contemplated that the server 106 may be configured to store the acoustic feature vector output 208 in association with the plurality of speech units 350 in the processing database 124 for future use thereof.

Figure 7:
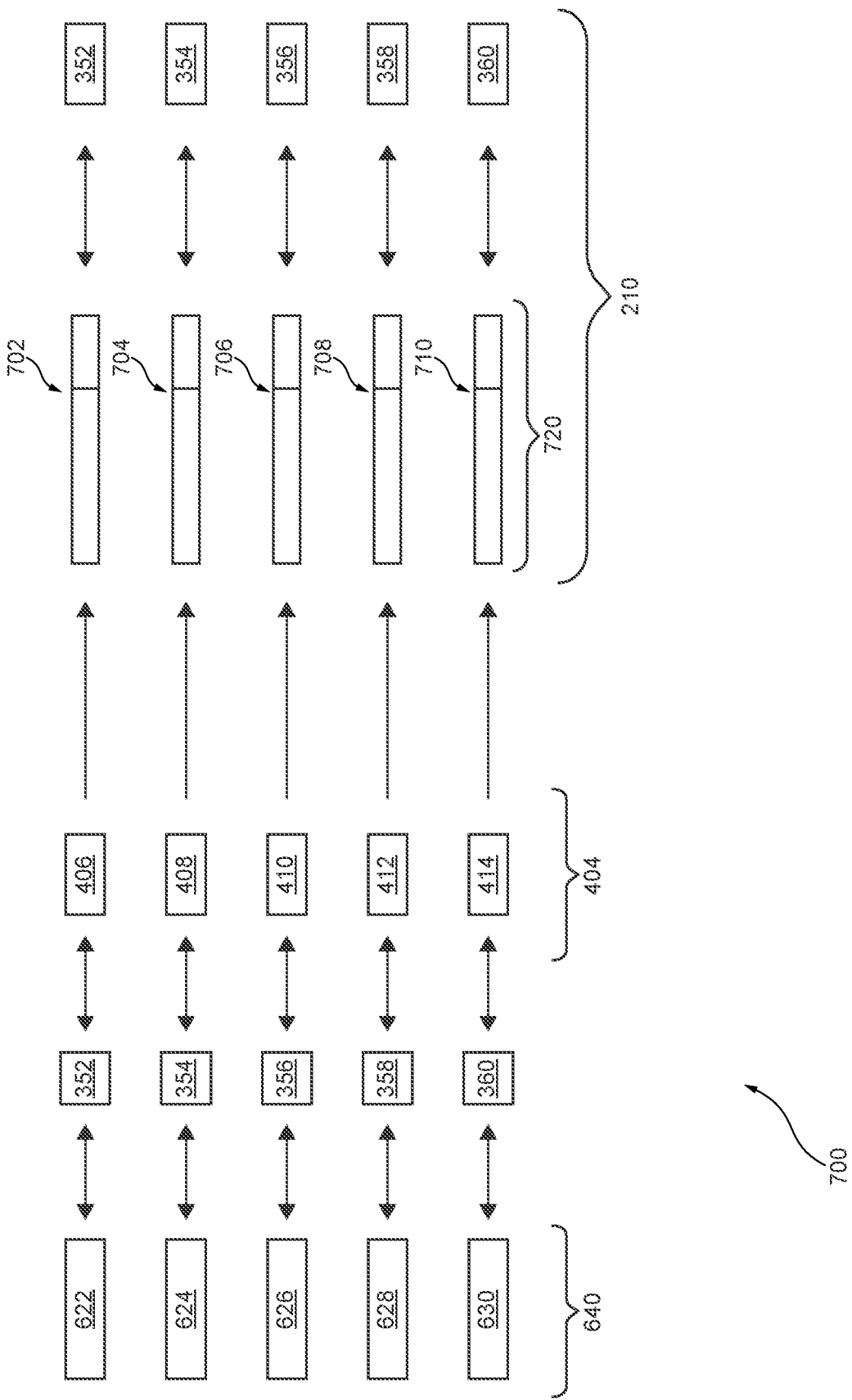
FIG. 7 is a schematic illustration of an enhanced feature vector generation procedure according to some embodiments of the present technology.

With reference to FIG. 7, there is depicted the enhanced feature vector generation procedure 700 executed by the server 106. The server 106 is configured to execute the enhanced feature vector generation procedure 700 based on (i) the textual feature vector output 204 and (ii) the acoustic feature vector output 208. The server 106 is configured to combine, for each speech unit in the plurality of speech units 350 (i) the respective textual feature vector of the plurality of textual feature vectors 404 with (ii) the respective acoustic feature vector of the plurality of acoustic feature vectors 640. For example, the server 106 may be configured to concatenate, for a given speech unit, a respective textual feature vector and a respective acoustic feature vector in order to generate a respective enhanced feature vector.

As such, the server 106 may be configured to generate:
a first enhanced feature vector 702 for the first speech unit 352 by combining the first textual feature vector 406 and the first acoustic feature vector 622;
a second enhanced feature vector 704 for the second speech unit 354 by combining the second textual feature vector 408 and the second acoustic feature vector 624;
a third enhanced feature vector 706 for the third speech unit 356 by combining the third textual feature vector 410 and the third acoustic feature vector 626;
a fourth enhanced feature vector 708 for the fourth speech unit 358 by combining the fourth textual feature vector 412 and the fourth acoustic feature vector 628; and
a fifth enhanced feature vector 710 for the fifth speech unit 360 by combining the fifth textual feature vector 414 and the fifth acoustic feature vector 630.

It is contemplated that a given one of a plurality of enhanced feature vectors 720 comprises information indicative of textual features and acoustic features of a respective speech unit of the plurality of speech units 350.

As a result of the enhanced feature vector generation procedure 700, the server 106 determines the enhanced feature vector output 210 comprising the plurality of enhanced feature vectors 720 respectively associated with the plurality of speech units 350. It is contemplated that the server 106 may be configured to store the enhanced feature vector output 210 in association with the plurality of speech units 350 in the processing database 124 for future use thereof.

Figure 8:
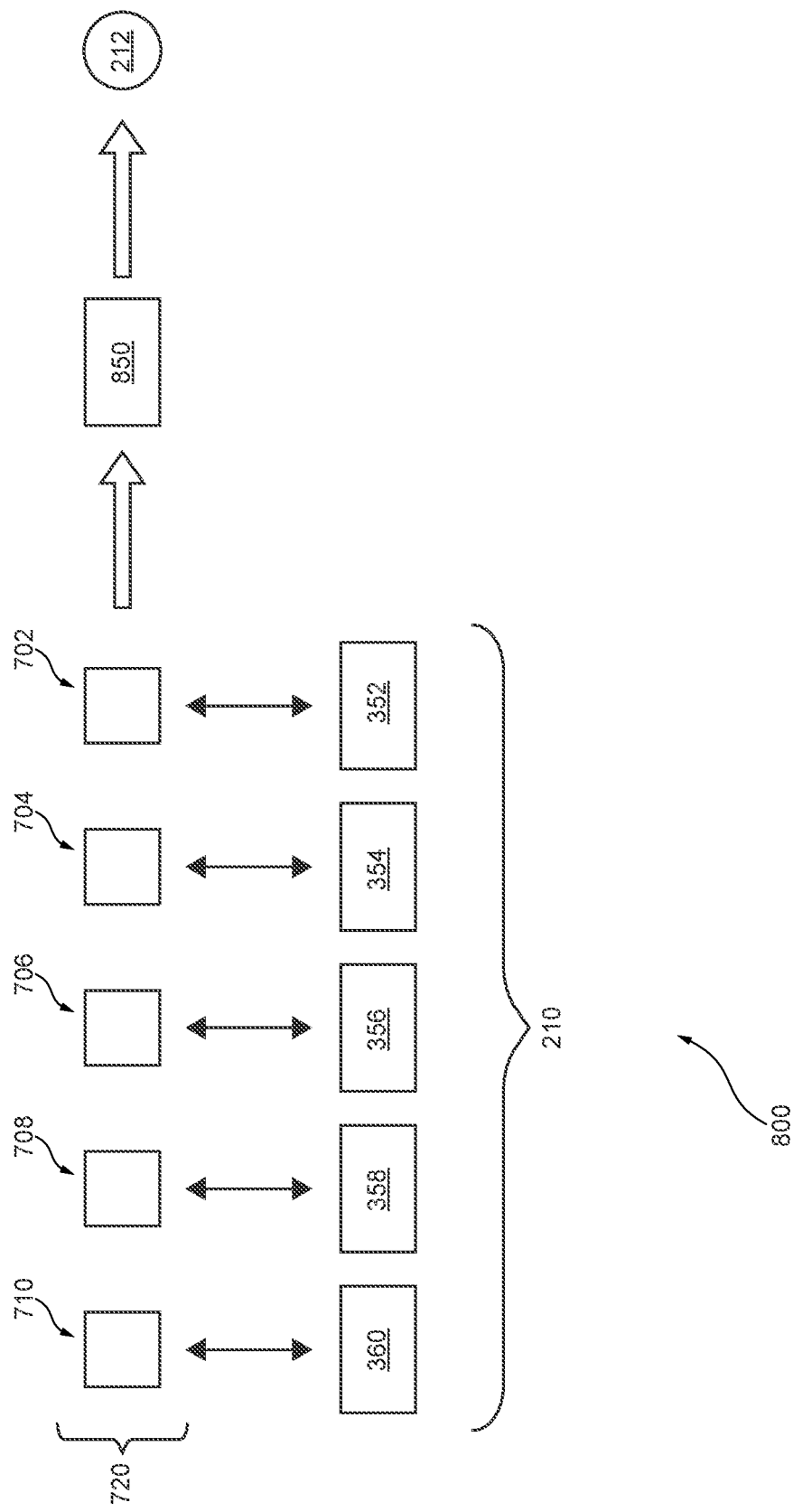
FIG. 8 is a schematic illustration of a intent determination procedure according to some embodiments of the present technology.

With reference to FIG. 8, there is depicted the intent determination procedure 800 executed by the server 106. More specifically, the intent determination procedure 800 corresponds to the in-use phase of the RNN 850, as previously explained, where the RNN 850 receives as input the plurality of enhanced feature vectors 720 of the enhanced feature vector output 210.

It should be noted that the plurality of enhanced feature vectors 720 are inputted into the RNN 850 according to the temporal order in which the respectively associated speech units occurred in the spoken user utterance. Alternatively, it is contemplated that, in some embodiments of the present technology, data indicative of the temporal order of the respectively associated speech units (e.g., data indicative of the respective positions in the spoken user utterance 150) may be included within the respective enhanced feature vectors or otherwise deduced by the RNN 850 from the respective enhanced feature vectors.

In some embodiments of the present technology, it is contemplated that the RNN 850 may be implemented with "an attention mechanism". How this "attention mechanism" may be implemented by the RNN 850 is disclosed in a published article, entitled *"Neural Machine Translation by Jointly Learning to Align and Translate"*, published as a conference paper at *"International Conference on Learning Representations"* in 2015, co-authored by Bandanau D., Cho K. and Bengio Y., the content of which in its entirety is incorporated herein by reference. Generally speaking, the RNN 850 implementing this attention mechanism, in a sense, "decides" to which of the speech units it should pay more attention during generation of the output 212. Indeed, the RNN 850, by implementing the attention mechanism, may determine that some speech units are more important than others and, therefore, have a higher influence during generation of the output 212.

As a result, the RNN 850 is configured to generate the output 212. The output 212 is indicative of a probability of the intent of the spoken user utterance 150 to be associated with a given type of intent for which the RNN 850 has been trained. For example, if the RNN 850 has been trained to estimate the probability of a given spoken user utterance to be associated with the open-ended question type of intent, the output 212 is indicative of the probability of the intent of the spoken user utterance 150 to be associated with the open-ended question type.

In some embodiments of the present technology, the server 106 may compare the output 212 with a pre-determined threshold. If the output 212 is above the pre-determined threshold, the server 106 may determine that the spoken user utterance 150 is associated with an intent being of the given type (for example, the open-ended question type). If the output 212 is below the pre-determined threshold, the server 106 may determine the spoken user utterance 150 is not of the given type of intent.

Let it be assumed that the server 106 compares the output 212 with the pre-determined threshold and that the output 212 is above the pre-determined threshold. As such, the server 106 may determine that the spoken user utterance 150 is associated with the intent being of the open-ended question type.

In response to determining that the spoken user utterance 150 is associated with the intent being of the open-ended question type, the server 106 may be configured to generate an intent-specific response (information) to be provided to the user 102. For example, instead of generating a response such as "Yes", the server 106 may generate, in response to determining that the spoken user utterance 150 is associated with the intent being of the open-ended question type, an intent-specific response such as "Kombucha refers to a variety of fermented, and indeed, lightly effervescent, sweetened black or green tea drinks. It is produced by fermenting tea using a symbiotic culture of bacteria and yeast which gives it effervescency".

In some embodiments of the present technology, the server 106 may be configured, in addition to determining the type of intent of a given spoken user utterance, to determine a "context" of the given spoken user utterance. For example, let it be assumed that the digital audio signal 155, when processed by the speech-to-text analysis 300 of the server 106 is representative of the following uttered sentence "Can I go to an event downtown". As a result, similarly to what has been described above, the server 106 may be configured to generate respective enhanced feature vectors for each one of the following speech units: speech unit associated with the word "Can", speech unit associated with the word "I", speech unit associated with the word "go", speech unit associated with the word "to", speech unit associated with the word "an", speech unit associated with the word "event", speech unit associated with the word "downtown", speech unit associated with the pause between "Can" and "I", speech unit associated with the pause between "I" and "go", speech unit associated with the pause between "go" and "to", speech unit associated with the pause between "to" and "an", speech unit associated with the pause between "an" and "event" and speech unit associated with the pause between "event" and "downtown".

The server 106 may also be configured to employ the RNN 850 for determining the intent of the spoken user utterance 150. Let it be assumed that the server 106 determines that the spoken user utterance 150 "Can I go to an event downtown" is associated with a given intent being of the open-ended question type, similarly to what has been described above. As a result, the server 106 may not generate a response such as "Yes", but is rather configured to generate a given intent-specific response.

However, it should be understood that, when the spoken user utterance 150 "Can I go to an event downtown" is uttered with the open-ended type of intent, it may also be uttered by the user 102 in a variety of contexts. In this case, the context of the spoken user utterance 150 may be either, for example, (i) related to a selection of a given event amongst all events in downtown or (ii) related to an itinerary or some other type of travel information for getting to a given event happening in downtown. Indeed, when a human hears the spoken user utterance 150 "Can I go to an event downtown", (s)he may determine that the user 102 is "accentuating" or "emphasizing" one of (i) the word "event" or (ii) the word "downtown". As a result, the intent-specific information to be provided to the user 102 by the server 106 may depend, not only on a given type of intent of the spoken user utterance 150, but also, in a sense, on a given word serving as a "contextual anchor" for the spoken user utterance 150.

The server 106 may be configured to employ an auxiliary MLA in order to determine which speech unit is associated with a given word serving as the contextual anchor (i.e., target word) for the respective given spoken user utterance.

Without wishing to be bound to any specific theory, developers of the present technology empirically determined that outputs of the "input gate" of the RNN 850 are indicative of relationships between given words and contexts of spoken user utterances. In other words, when the enhanced feature vectors of speech units of a given spoken user utterance are inputted into the RNN 850, the server 106 may acquire, from the RNN 860, a given input gate vector for each enhanced feature vector and, thus, associated with a respective speech unit. The auxiliary MLA is trained to predict which word serves as the contextual anchor (i.e., the target word) in the respective spoken user utterance based on these input gate vectors. How the auxiliary MLA has been trained and is used to predict which word in the respective spoken user utterance is the target word will now be described.

During a training iteration of the auxiliary MLA, the auxiliary MLA may be inputted with a training set. The training set may be generated in part by a human assessor and in part by the RNN 850. For example, for a given previous digital audio signal stored in the processing database 124, the server 106 may generate a plurality of enhanced feature vectors, similarly to what has been described above. In addition, a human assessor may label a given word associated with a given speech unit of the previous digital audio signal as serving as the contextual anchor (i.e. training target word) for the respective previous user spoken utterance. Also, the plurality of enhanced feature vectors may be inputted into the RNN 850, from which the server 106 acquires respective training input gate vectors for each speech unit (or for speech units associated with words only) of the training digital audio signal.

To summarize, the training set is composed of (i) a plurality of input gate vectors and (ii) a label indicative of which one of the plurality of input gate vectors is associated with a word serving as the contextual anchor (i.e., the training target word) for the previous spoken user utterance.

When the training set is inputted into the auxiliary MLA, the auxiliary MLA in a sense "learns" that, amongst all the training input gate vectors for the previous spoken user utterance, the training input gate vector associated with the target word is a "desired" vector. As such, during in-use, the auxiliary MLA may be inputted with a plurality of in-use input gate vectors and may output, in response, values indicative of a probability of each respective speech unit (or speech units associated with words only) to be associated with the target word of the in-use spoken user utterance.

Returning to the example of the spoken user utterance 150 "Can I go to an event downtown", the server 106 may acquire a plurality of in-use input gate vectors (e.g., auxiliary data for each speech unit) generated by the RNN 850 for the speech units associated with the respective words "Can", "I", "go", "to", "an", "event" and "downtown". The server 106 is then configured to input the plurality of in-use input gate vectors (e.g., auxiliary data for each speech unit) into the auxiliary MLA for estimating which one of the words "Can", "I", "go", "to", "an", "event" and "downtown" serves as the contextual anchor for the spoken user utterance 150 (for estimating which one of these words is the target word).

Let it be assumed that the server 106 employing the auxiliary MLA determines that the word "downtown" is associated with a highest probability amongst the words "Can", "I", "go", "to", "an", "event" and "downtown" of serving as the contextual anchor for the spoken user utterance 150. This means that the server 106 may determine that the target word is "downtown".

As a result, the server 106 may generate an intent-specific response that is not only specific to the given intent of the spoken user utterance 150 (e.g., the open-ended question type) but also associated with the contextual anchor "downtown". Thus, the server 106 may generate an intent-specific response representing information associated with an itinerary for the user 102 for arriving into downtown from his current location, for example, instead of listing possible events happening in downtown. In other words, the server 106 may be configured to "fine tune" (i.e. make it more relevant) the intent-specific response based on the "anchor word".

Figure 9:
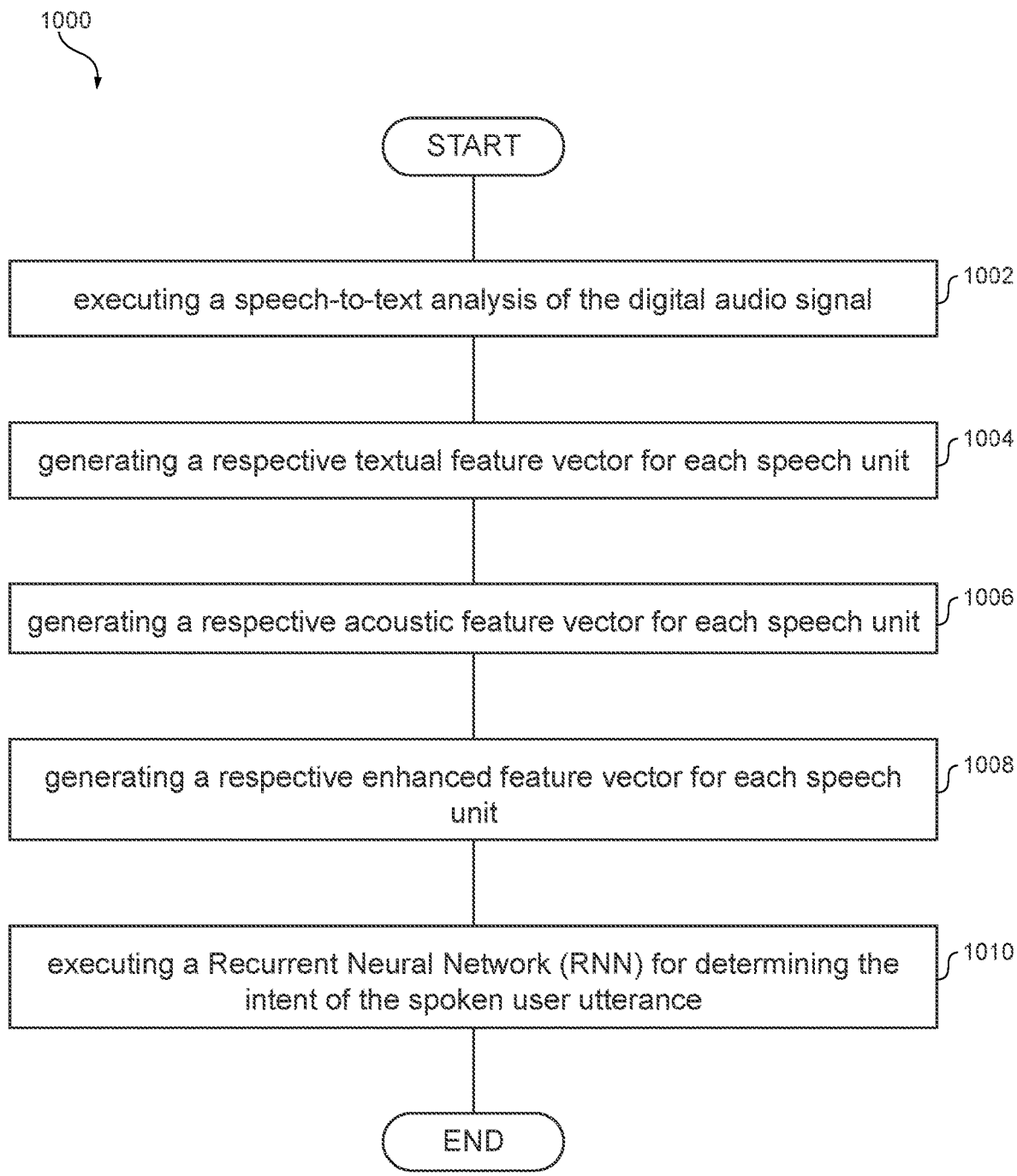
FIG. 9 is a schematic block diagram illustrating a flow chart of a method of determining an intent associated with a spoken user utterance according to some embodiments of the present technology.

With reference to FIG. 9, there is depicted a scheme-block illustration of a method 1000 of determining the intent of the spoken user utterance 150 according to some embodiments of the present technology. Although the method 1000 will be described as being executed by the server 106, it should be contemplated that device 104 may be configured to execute at least some steps of the method 1000 similarly to how the server 106 is configured to execute the at least some steps of the method 1000, without departing from the scope of the present technology.

STEP 1002: Executing a Speech-To-Text Analysis of the Digital Audio Signal

The method 1000 begins at step 1002 with the server 106 being configured to execute the speech-to-text analysis 300 of the digital audio signal 155 as best depicted in FIG. 3. More specifically, the execution of the speech-to-text analysis 300 of the digital audio signal 155 results in the determination of at least one speech unit associated with the digital audio signal 155.

For example, in the scenario illustrated in FIG. 3, the execution of the speech-to-text analysis 300 of the digital audio signal 155 results in the determination of the plurality of speech units 350. Each one of the plurality of speech units 350 is respectively associated with one of (i) a word and (ii) a pause. For example, the first, the third and the fifth speech unit 352, 356 and 360 are associated with respective words that have been "uttered" as part of the spoken user utterance 150 while the second and the fourth speech unit 354 and 358 are associated with respective pauses that are present between the "uttered" words in the spoken user utterance 150.

In some embodiments of the present technology, it is contemplated that the execution of the speech-to-text analysis 300 may comprise determining textual data for each speech unit. Indeed, each speech unit has respective textual data representative of the respective word or pause. For example, the first speech unit 352 has the textual data 302 representative of the respective word "Is". Similarly, the third speech unit 356 has the textual data 304 representative of the respective word "Kombucha" and the fifth speech unit 360 has the textual data 306 representative of the respective word "Effervescent". In another example, the second speech unit 354 has the textual data 318 representative of the first pause while the fourth speech unit 358 has the textual data 318 representative of the second pause.

It is contemplated that the textual data 318 and 320 may be representative of a space or any other marker indicative of a pause. Alternatively, the textual data 318 and 320 may be representative of a null value or any character representative of a null value. Optionally, the second and the fourth speech unit 354 and 358 may not need to have textual data representative of a respective pause but, instead, have some type of information that is indicative that the second and the fourth speech unit 354 and 358 are associated with respective pauses in the spoken user utterance 150.

It should be understood that each one of the plurality of speech units 350 also has a corresponding segment of the digital audio signal 155. For example, the first speech unit 352 has the corresponding segment 308 of the digital audio signal 155 having a respective time interval defined between $t_1$ and $t_2$. It is thus contemplated that the execution of the speech-to-text analysis 300 may comprise determining the time interval of the corresponding segment of the digital audio signal 155 associated with each respective speech unit of the plurality of speech units 350.

As best seen in FIG. 2, the speech-to-text output 202 comprising the plurality of speech units 350 may be used by the server 106 for executing the textual feature vector generation procedure 400 and the acoustic feature vector generation procedure 500. It is contemplated that the server 106 may store the speech-to-text output 202 in associated with the digital audio signal 155 in the processing database 124 for future use thereof.

It is contemplated that once the speech-to-text output 202 is generated by the speech-to-text analysis 300 executed by the server 106, the textual feature vector generation procedure 400 and the acoustic feature vector generation procedure 500 may be executed by the server 106.

It should be understood that steps 1004, 1006 and 1008 described below may be executed by the server 106 for each one of the plurality of speech units 350 in different sequences. For example, the steps 1004, 1006 and 1008 may be executed for a first given one of the plurality of speech units 350 and then for a second given one of the plurality of speech units 350 and so on. In another example, the step 1004 may be executed for each one of the plurality of speech units 350, then the step 1006 may be executed for each one of the plurality of speech units 350 and then the step 1008 may be executed for each one of the plurality of speech units 350.

In other words, it is contemplated that in some embodiments of the present technology, the steps 1004, 1006 and 1008 may be executed by the server 106 for any given speech unit independently of any other given speech unit.

STEP 1004: Generating a Respective Textual Feature Vector for Each Speech Unit The method 1000 the continues with the step 1004 with the server 106, for each one of the plurality of speech units 350, generating a respective textual feature vector as best seen in FIG. 4 with reference to the textual feature vector generation procedure 400.

The generation of a given textual feature vector is executed by the server 106 by (i) determining textual features of the respective speech unit based on the textual data associated with the respective speech unit and (ii) generating the given textual feature vector based on the respective textual features.

It is contemplated that the generation of the plurality of textual feature vectors 404 may be executed by a word embedding process implemented by the server 106. For example, the server 106 may execute the word embedding algorithm 402 in order to generate the plurality of textual feature vectors 404. In one embodiment, the word embedding algorithm 402 may be executed by the server 106 employing a given one of the plurality of MLAs 852. In another embodiment, the word embedding algorithm 402 may be executed by the server 106 employing a dedicated NN having been trained to perform word embedding, without departing from the scope of the present technology.

It is also contemplated that when a given speech unit is associated with a pause, the respective textual feature vector may be a null vector. For example, the second and the fourth textual feature vector 408 and 412 of the plurality of textual feature vectors 404 may be null vectors. In other words, the second and the fourth textual feature vector 408 and 412 may have the same dimensionality as the first, the third and the fifth textual feature vector 406, 410 and 414 and filled with null values.

In other embodiments of the present technology, the server 106 may be configured to generate textual feature vectors only for speech units that are associated with words. Put another way, the server 106 may be configured to generate the first, the third and the fifth textual feature vector 406, 410 and 414 only and automatically assign null vectors as textual feature vectors for speech units associated with pauses. It is contemplated that pre-defined/pre-generated null vector(s) may be stored in the processing database 124 and retrieved by the server 106 upon determining that a given speech unit is associated with a pause.

It is also contemplated that the server 106 may be configured to store the textual feature vector output 204 comprising the plurality of textual feature vectors 404 respectively associated with the plurality of speech units 350 in the processing database 124.

STEP 1006: Generating a Respective Acoustic Feature Vector for Each Speech Unit The method 1000 continues with the step 1006 with the server 106, for each one of the plurality of speech units 350, generating a respective acoustic feature vector by executing the acoustic feature vector generation procedure 500. The generation of a given acoustic feature vector is executed by the server 106 by (i) determining acoustic features of of the corresponding segment of the digital audio signal 155 based on the corresponding segment of the digital audio signal 155 and (ii) generating the given acoustic feature vector based on the respective acoustic features.

In some embodiments of the present technology, it is contemplated that the acoustic features may include at least some of: volume level, pitch level, energy level, harmonicity (e.g., autocorrelation of pitch), tempo (e.g., number of phonemes per time unit), spectral features and the like.

In some embodiments of the present technology, it is contemplated that the acoustic feature vector generation procedure 500 may comprise (i) the intermediary acoustic feature vector generation procedure 550 as best seen in FIG. 5 and (ii) the statistical aggregation procedure 600 as best seen in FIG. 6.

With reference to FIG. 5, executing the intermediary acoustic feature vector generation procedure 550 by the server 106 may comprise segmenting the digital audio signal 155 into respective sub-segments of the digital audio signal 155. For example, the digital audio signal 155 may be segmented by the sliding window 552 applied thereto by the server 106, which slides with the time step 554 along the digital audio signal 155 in the direction of the arrow 553.

It is contemplated that the sliding window 552 may be of a pre-determined time length. The time step 554 according to which the sliding window 552 slides may be of another pre-determined time length.

It should be noted that the time interval of each sub-segment (e.g., the pre-determined time length of the sliding window 5532) is shorter than the time intervals of the segments of the digital audio signal corresponding to respective speech units.

It is contemplated that if the pre-determined time length of the time step 554 is equal to the pre-determined time length of the sliding window 552, the respective sub-segments of the digital audio signal 155 are complementary and do not overlap each other.

However, it is contemplated that, if the pre-determined time length of the time step 554 is inferior to the pre-determined time length of the sliding window 552, the respective sub0segments of the digital audio signal 155 may partially overlap as depicted in FIG. 5.

For example, the second portion 564 is a portion of the first sub-segment 556 that is overlapped by the second sub-segment 558. Thus, it can be said that the first sub-segment 556 and the second sub-segment 558 are two sub-segments of the digital audio signal 155 that partially overlap.

In some embodiments of the present technology, the server 106 may be configured to generate the plurality of intermediary acoustic feature vectors 590 associated with respective sub-segments of the digital audio signal 155 based on the acoustic features of the respective sub-segments.

In other embodiments of the present technology, the server 106 may be configured to generate a given acoustic feature vector for a given segment of the digital audio signal corresponding to a given speech unit based on the respective intermediary acoustic feature vectors.

For example, and with reference to FIG. 6, the server 106 may determine that the intermediary acoustic feature vectors of the first sub-set of intermediary acoustic feature vectors 602 are associated with respective time intervals (of the respective sub-segments of the digital audio signal 155) that fall within the time interval defined between $t_0$ and $t_1$ of the first speech unit 352 (of the corresponding segment 308 of the digital audio signal 155).

As such, it can be said that the server 106 may associate the first sub-set of intermediary acoustic feature vectors 602 with the first speech unit 352 because all of the time intervals of the sub-segments respectively associated with the first sub-set of intermediary acoustic feature vectors 602 fall within the time interval of the segment 308 corresponding to the first speech unit 352.

Once the respective intermediary acoustic feature vectors of a given corresponding segment of the digital audio signal 155 are determined as described above, the server 106 may be configured to generate the respective acoustic feature vector for the speech unit of the given corresponding segment of the digital audio signal 155. As an example, the server 106 may generate the first acoustic feature vector 622 for the first speech unit 352 based on the first sub-set of intermediary acoustic feature vectors 602 since each one of the first sub-set of intermediary acoustic feature vectors 602 is associated with the corresponding segment 308 of the digital audio signal 155.

As previously mentioned, the server 106 may execute the statistical aggregation procedure 600 on each sub-set of intermediary acoustic feature vectors for generating a respective acoustic feature vector for each speech unit. It is contemplated that the server 106 executing the statistical aggregation procedure 600 may comprise executing a statistically-driven combination of the respective sub-sets of intermediary acoustic feature vectors.

It is also contemplated that the statistical aggregation procedure 600, in some embodiments of the present technology, may take into account at least some of the following statistics: extremum (min and max) statistics, ranges of values, centroids, standard deviations, variances, skewness, kurtosis, percentiles, number of null value crossings, peak statistics, average statistics, polynomial regressions of different orders and the like.

In some embodiments of the present technology, it is contemplated that as a result of the step 1006, the server 106 may generate the plurality of acoustic feature vectors 640 respective associated with the plurality of speech units 350. It is contemplated that the server 106 may also store the plurality of acoustic feature vectors 640 in association with the respective ones of the plurality of speech units 350 in the processing database 124.

STEP 1008: Generating a Respective Enhanced Feature Vector for Each Speech Unit The method 1000 then continues to step 1008 with the server 106 generating a respective enhanced feature vector for each speech unit by combining the respective textual feature vector, having been generated during the step 1004, and the respective acoustic feature vector, having been generated during the step 1006.

In some embodiments of the present technology, the server 106 combining the respective textual feature vector and the respective acoustic feature vector comprises concatenating the respective textual feature vector with the acoustic feature vector thereby generating the respective enhanced feature vector.

With reference to FIG. 7, there is depicted the enhanced feature vector generation procedure 700 executed by the server 106. The server 106 may execute the enhanced feature vector generation procedure 700 based on (i) the textual feature vector output 204 and (ii) the acoustic feature vector output 208. It is contemplated that a given one of the plurality of enhanced feature vectors 720 comprises information indicative of textual features and acoustic features of a respective speech unit of the plurality of speech units 350.

It is contemplated that the server 106 may be configured to store the plurality of enhanced feature vectors 720 in association with the plurality of speech units 350 in the processing database 124 for future use thereof.

STEP 1010: Executing a RNN for Determining the Intent of the Spoken User Utterance The method 1000 ends at step 1010 with the server 106 employing the RNN 850 (or another possible type of NN) configured to determine the intent of the spoken user utterance 150 by inputting into the RNN 850 the plurality of enhanced feature vectors 720.

As a result, the RNN 850 is configured to generate the output 212 indicative of a probability of the intent of the spoken user utterance 150 to be associated with a given type of intent for which the RNN 850 has been trained. For example, if the RNN 850 has been trained to estimate the probability of a given spoken user utterance to be associated with the open-ended question type, the output 212 is indicative of the probability of the intent of the spoken user utterance 150 to be associated with the open-ended question type.

In some embodiments of the present technology, the server 106 may compare the output 212 with a pre-determined threshold. If the output 212 is above the pre-determined threshold, the server 106 may determine that the spoken user utterance 150 is associated with an intent being of the given type (for example, the open-ended question type). If the output 212 is below the pre-determined threshold, the server 106 may determine the spoken user utterance 150 is not of the given type of intent.

Let it be assumed that the server 106 compares the output 212 with the pre-determined threshold and that the output 212 is above the pre-determined threshold. As such, the server 106 may determine that the spoken user utterance 150 is associated with the intent being of the open-ended question type.

In response to determining that the spoken user utterance 150 is associated with the intent being of the open-ended question type, the server 106 may be configured to generate an intent-specific response (information) to be provided to the user 102. For example, instead of generating a response such as "Yes", the server 106 may generate, in response to determining that the spoken user utterance 150 is associated with the intent being of the open-ended question type, an intent-specific response such as "Kombucha refers to a variety of fermented, and indeed, lightly effervescent, sweetened black or green tea drinks. It is produced by fermenting tea using a symbiotic culture of bacteria and yeast which gives it effervescency". In response to the determining that the spoken user utterance 150 is not associated with the intent being of the open-ended question type (i.e. the determining resulting in a negative outcome), the server 106 may generate an appropriate intent-specific response.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining an intent associated with a spoken user utterance, the spoken user utterance having been captured in a form of a digital audio signal, the method executable by a server, the method comprising:
   executing, by the server, a speech-to-text analysis of the digital audio signal to determine:
      at least one speech unit of the spoken user utterance, each speech unit having textual data representative of one of a word and a pause, each speech unit having a corresponding segment of the digital audio signal;
   for each speech unit:
      generating a respective textual feature vector by:
         determining, by the server based on the respective textual data, textual features of the respective speech unit;
         generating, by the server based on the respective textual features, the respective textual feature vector;
      generating a respective acoustic feature vector by:
         determining, by the server based on the corresponding segment of the digital audio signal, respective acoustic features of the corresponding segment of the digital audio signal;
         generating, by the server based on the respective acoustic features, the respective acoustic feature vector;
      generating, by the server, a respective enhanced feature vector by combining the respective acoustic feature vector and the respective textual feature vector;
   employing, by the server, a neural network (NN) configured to determine the intent of the spoken user utterance by inputting into the NN the enhanced feature vectors, the NN having been trained to estimate a probability of the intent being of a given type.

2. The method of claim 1, wherein the NN is a recurrent neural network (RNN).

3. The method of claim 1, wherein the executing the speech-to-text analysis comprises determining:
   the textual data of each speech unit; and
   a time interval of the corresponding segment of the digital audio signal of each speech unit.

4. The method of claim 1, wherein the generating the respective textual feature vector is executed by a word embedding process implemented by the server.

5. The method of claim 1, wherein the textual feature vector of a given speech unit that is a pause is a vector with null values.

6. The method of claim 1, wherein the acoustic features are at least some of:
volume level;
energy level;
pitch level;
harmonicity; and
tempo.

7. The method of claim 1, wherein the determining the respective acoustic features of the corresponding segment of the digital audio signal comprises:
determining, by the server, respective acoustic features of each sub-segment of the corresponding segment of the digital audio signal by applying a sliding window, and wherein
the generating the respective acoustic feature vector comprises:
generating, by the server, respective intermediary acoustic feature vectors for each sub-segment based on the respective acoustic features; and
generating, by the server based on the respective intermediary acoustic feature vectors, the respective acoustic feature vector for the corresponding segment of the digital audio signal.

8. The method of claim 7, wherein each sub-segment is of a pre-determined time length.

9. The method of claim 7, wherein at least two sub-segments partially overlap.

10. The method of claim 7, wherein the sliding window slides with a time step of another pre-determine time length.

11. The method of claim 7, wherein the generating the respective acoustic feature vector for the corresponding segment of the digital audio signal based on the respective intermediary acoustic feature vectors comprises executing, by the server, a statistically-driven combination of the respective intermediary acoustic feature vectors.

12. The method of claim 1, wherein the combining the respective acoustic feature vector and the respective textual feature vector comprises concatenating, by the server, the respective acoustic feature vector and the respective textual feature vector.

13. The method of claim 1, wherein the given type is one of:
open-ended question type;
closed-ended question type;
statement type; and
exclamation type.

14. The method of claim 1, wherein the method further comprises:
acquiring, by the server, auxiliary data generated by the NN for each inputted enhanced feature vector associated with a given word;
responsive to determining that the intent is of the given type:
executing, by the server, an auxiliary MLA for determining a target word amongst the at least one word by inputting into the auxiliary MLA the auxiliary data, the target word being indicative of a context of the spoken user utterance.

15. A server for determining an intent associated with a spoken user utterance, the spoken user utterance having been captured in a form of a digital audio signal, the server being configured to:
execute a speech-to-text analysis of the digital audio signal to determine:
at least one speech unit of the spoken user utterance, each speech unit having textual data representative of one of a word and a pause, each speech unit having a corresponding segment of the digital audio signal;
for each speech unit:
generate a respective textual feature vector by:
determining, by the server based on the respective textual data, textual features of the respective speech unit;
generating, by the server based on the respective textual features, the respective textual feature vector;
generate a respective acoustic feature vector by:
determining, by the server based on the corresponding segment of the digital audio signal, respective acoustic features of the corresponding segment of the digital audio signal;
generating, by the server based on the respective acoustic features, the respective acoustic feature vector;
generate a respective enhanced feature vector by combining the respective acoustic feature vector and the respective textual feature vector;
employ a neural network (NN) configured to determine the intent of the spoken user utterance by inputting into the NN the enhanced feature vectors, the NN having been trained to estimate a probability of the intent being of a given type.

16. The server of claim 15, wherein the NN is a recurrent neural network (RNN).

17. The server of claim 15, wherein the server configured to execute the speech-to-text analysis comprises the server being configured to determine:
the textual data of each speech unit; and
a time interval of the corresponding segment of the digital audio signal of each speech unit.

18. The server of claim 15, wherein the server configured to determine the respective acoustic features of the corresponding segment of the digital audio signal comprises the server being configured to:
determine respective acoustic features of each sub-segment of the corresponding segment of the digital audio signal by applying a sliding window, and wherein
the server configured to generate the respective acoustic feature vector comprises the server being configured to:
generate respective intermediary acoustic feature vectors for each sub-segment based on the respective acoustic features; and
generate, based on the respective intermediary acoustic feature vectors, the respective acoustic feature vector for the corresponding segment of the digital audio signal.

19. The server of claim 1, wherein the given type is one of:
open-ended question type;
closed-ended question type;
statement type; and
exclamation type.

20. The server of claim 15, wherein the server is further configure to:
acquire auxiliary data generated by the NN for each inputted enhanced feature vector associated with a given word;
responsive to determining that the intent is of the given type:

execute an auxiliary MLA for determining a target word amongst the at least one word by inputting into the auxiliary MLA the auxiliary data, the target word being indicative of a context of the spoken user utterance.

* * * * *